United States Patent
Webber et al.

(10) Patent No.: US 10,372,453 B2
(45) Date of Patent: Aug. 6, 2019

(54) FETCHING INSTRUCTIONS IN AN INSTRUCTION FETCH UNIT

(71) Applicant: MIPS Tech, LLC, Santa Clara, CA (US)

(72) Inventors: Andrew David Webber, Tring (GB); Daniel Ángel Chaver Martínez, Madrid (ES); Enrique Sedano Algarabel, Watford (GB)

(73) Assignee: MIPS Tech, LLC, Campbell, CA (US)

( * ) Notice: Subject to any disclaimer, the term of this patent is extended or adjusted under 35 U.S.C. 154(b) by 68 days.

(21) Appl. No.: 15/624,121

(22) Filed: Jun. 15, 2017

(65) Prior Publication Data

US 2017/0364357 A1    Dec. 21, 2017

(30) Foreign Application Priority Data

Jun. 16, 2016 (GB) .................................. 1610541.3

(51) Int. Cl.
*G06F 9/30* (2018.01)
*G06F 9/38* (2018.01)
*G06F 12/00* (2006.01)

(52) U.S. Cl.
CPC ........ *G06F 9/30047* (2013.01); *G06F 9/3009* (2013.01); *G06F 9/30189* (2013.01); *G06F 9/3802* (2013.01); *G06F 9/3851* (2013.01); *G06F 12/00* (2013.01)

(58) Field of Classification Search
None
See application file for complete search history.

(56) References Cited

U.S. PATENT DOCUMENTS

| | | |
|---|---|---|
| 5,423,014 A | 6/1995 | Hinton et al. |
| 6,230,260 B1 | 5/2001 | Luick |
| 2003/0065887 A1 | 4/2003 | Maiyuran et al. |
| 2014/0372736 A1* | 12/2014 | Greenhalgh .......... G06F 9/3806 712/239 |
| 2016/0259644 A1* | 9/2016 | Brandt ................ G06F 9/30189 |

* cited by examiner

*Primary Examiner* — William B Partridge
(74) *Attorney, Agent, or Firm* — Adams Intellex, PLC

(57) ABSTRACT

A method in an instruction fetch unit configured to initiate a fetch of an instruction bundle from a first memory and to initiate a fetch of an instruction bundle from a second memory, wherein a fetch from the second memory takes a predetermined fixed plurality of processor cycles, the method comprising: identifying that an instruction bundle is to be selected for fetching from the second memory in a predetermined future processor cycle; and initiating a fetch of the identified instruction bundle from the second memory a number of processor cycles prior to the predetermined future processor cycle based upon the predetermined fixed plurality of processor cycles taken to fetch from the second memory.

17 Claims, 5 Drawing Sheets

FETCHING INSTRUCTIONS IN AN INSTRUCTION FETCH UNIT

BACKGROUND

A Central Processing Unit (CPU) typically includes an Instruction Fetch Unit (IFU) that is configured to manage the fetching of program instructions from memory. In multi-threaded processors, the IFU is configured to concurrently handle the fetching of program instructions for a number of different threads.

An IFU may include one or more levels of instruction cache, each level of which are small hardware-managed memories that store a subset of program instructions and that can be accessed faster than Main Memory (usually, the first level can be accessed in a single processor cycle).

An IFU may also comprise an on-chip high-speed local memory, such as an Instruction Scratchpad Random-Access Memory (ISPRAM) which is managed in software, either by the programmer or through compiler support. This memory may be used to store critical blocks of code that need to be retrieved with a small and predictable latency. Usually, large ISPRAM arrays are necessary to meet an application's demands. However, integration of such a large memory in a high performance processor can severely damage performance if not handled cleverly, as its access may require several cycles.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An Instruction Fetch Unit (IFU) may access program instructions from a small, fast memory such as an instruction cache which only requires a single processor cycle to access, or the IFU may access program instructions from a larger memory which requires multiple processor cycles to access. For example, in a multithreaded CPU a particular thread may need access to an ISPRAM. Program instructions stored in the ISPRAM may require a predetermined plurality of processor cycles to access due to the size of the ISPRAM. In such a situation, there is a risk of collision in the IFU between a previously issued multiple-cycle request to the ISPRAM and a more recently issued single-cycle request for a program instruction from the instruction cache.

One approach to handling such a collision is to stall the IFU when a multi-cycle request has been started. However, whilst such an approach may avoid a possible collision between the older multi-cycle access and the more recent single-cycle request, this trivial approach suffers from significant performance slowdown caused by the stalling of the IFU which in some applications may be unacceptable.

There is therefore a need for an improved approach to performing the instruction fetch in this scenario.

There is provided a method in an instruction fetch unit configured to initiate a fetch of an instruction bundle from a first memory and to initiate a fetch of an instruction bundle from a second memory, wherein a fetch from the second memory takes a predetermined fixed plurality of processor cycles, the method comprising: identifying that an instruction bundle is to be selected for fetching from the second memory in a predetermined future processor cycle; and initiating a fetch of the identified instruction bundle from the second memory a number of processor cycles prior to the predetermined future processor cycle based upon the predetermined fixed plurality of processor cycles taken to fetch from the second memory.

There is provided an instruction fetch unit configured to initiate a fetch of an instruction bundle from a first memory and to initiate a fetch of an instruction bundle from a second memory, and wherein a fetch from the second memory takes a predetermined fixed number of processor cycles, the instruction fetch unit comprising: a control module configured to: identify that an instruction bundle is to be selected for fetching from the second memory in a predetermined future processor cycle; and initiate a fetch of the identified instruction bundle from the second memory a number of processor cycles prior to the predetermined future processor cycle based upon the predetermined fixed plurality of processor cycles taken to fetch from the second memory.

There may be provided computer readable code adapted to perform the steps of any of the methods described herein when the code is run on a computer. The computer readable code may be encoded on a computer readable storage medium.

The instruction fetch unit may be embodied in hardware on an integrated circuit. There may be provided a method of manufacturing, at an integrated circuit is manufacturing system, an instruction fetch unit. There may be provided an integrated circuit definition dataset that, when processed in an integrated circuit manufacturing system, configures the system to manufacture an instruction fetch unit. There may be provided a non-transitory computer readable storage medium having stored thereon a computer readable description of an integrated circuit that, when processed, causes a layout processing system to generate a circuit layout description used in an integrated circuit manufacturing system to manufacture an instruction fetch unit.

There may be provided an integrated circuit manufacturing system comprising: a computer readable storage medium having stored thereon a computer readable integrated circuit description that describes the instruction fetch unit; a layout processing system configured to process the integrated circuit description so as to generate a circuit layout description of an integrated circuit embodying the instruction fetch unit; and an integrated circuit generation system configured to manufacture the instruction fetch unit according to the circuit layout description, wherein the instruction fetch unit is configured to initiate a fetch of an instruction bundle from a first memory and to initiate a fetch of an instruction from a second memory, and wherein a fetch from the second memory takes a predetermined fixed number of processor cycles, wherein the instruction fetch unit comprises a control module configured to: identify that an instruction bundle is to be selected for fetching from the second memory in a predetermined future processor cycle; and initiate a fetch of the identified instruction bundle from the second memory a number of processor cycles prior to the predetermined future processor cycle based upon the predetermined fixed plurality of processor cycles taken to fetch from the second memory.

The fetch of the identified instruction bundle from the second memory may be performed in parallel with another memory access. Identifying that an instruction bundle is to be fetched from a second memory may comprise determining whether a memory address of the instruction bundle is within a range of memory addresses in the second memory.

A fetch from the first memory may take one processor cycle and the time taken between selecting an instruction bundle for fetching from the first memory and issuing the fetched instruction bundle is the fetch latency, wherein initiating a fetch of the identified instruction bundle from the second memory prior to the predetermined future processor cycle may be further based upon the duration of the fetch latency.

An instruction bundle may be selected for fetching each processor cycle, which may be based on a round-robin schedule. Instruction bundles to be fetched may each be associated with one of a plurality of threads. Identifying that an instruction bundle is to be selected for fetching from the second memory in a predetermined future processor cycle may comprise predicting which instruction bundle is to be selected for fetching in the predetermined future processor cycle. Predicting which bundle is to be selected for fetching in a predetermined future processor cycle ma comprise predicting which thread of a plurality threads is to be selected for fetching. Predicting which instruction bundle is to be selected for fetching in a predetermined future processor cycle may be based upon predicting which thread will be selected according to a round-robin schedule.

Predicting which bundle is to be selected for fetching may comprise: predicting a thread to be selected in a predetermined future processor cycle; determining a mode for the predicted thread; and selecting the next fetch address for the predicted thread.

A flag may be associated with each thread, the flag indicating that the thread is either fetchable or unfetchable; and the approach may include predicting a thread to be selected based upon threads that are flagged as fetchable.

A thread may be flagged as unfetchable due to at least one of a cache miss, a Translation Lookaside Buffer (TLB) miss, a buffer for execution being full, or a busy second memory bank; or flagging a thread as fetchable due to the buffer for execution no longer being full, a stabilized thread, a free second memory bank, a restart of a thread, or due to cache or TLB miss handling being finished.

In a future processor cycle, it may be identified that the predicted instruction bundle was not selected for fetching and the fetch of the predicted instruction bundle from the second memory may be halted; or the predicted instruction bundle may be selected for fetching in place of the instruction bundle actually selected at the future predetermined processor cycle.

A thread may be allocated to a first mode if it is determined that an instruction bundle associated with that thread is to be fetched from the first memory or to a second mode if it is determined that the instruction bundle associated with that thread is to be fetched from the second memory. It may be identified that a thread in the first mode requires a fetch from the second memory and the mode of the thread may be changed from the first mode to the second mode. It may be identified that a thread in the second mode requires a fetch from the first memory and the mode of the thread may be changed from the second mode to the first mode.

A plurality of stages may be performed, each taking a processor cycle, wherein each stage can be performed simultaneously for respective fetches. Changing the mode of a thread may further comprise stopping all stages in which an instruction bundle for that thread is currently being processed. It may be predicted that an instruction bundle contains a taken branch or jump instruction and all stages in which an instruction bundle for that thread is currently being processed may be stopped.

The plurality of stages for a thread in the first mode may comprise: a first stage (FT) that comprises selecting an instruction bundle for fetching; a second stage (FA) that comprises selecting an address for the instruction bundle accessing the first memory; a third stage (FC) that comprises accessing the first memory based upon the address selected in the second stage; and a fourth stage (FS) that comprises sending the instruction bundle fetched from the first memory to a buffer for execution. Further stages may include: a first pre-stage (N1) that comprises identifying an instruction bundle to be selected for fetching from the second is memory in a predetermined future processor cycle during the first stage (FT); and a second pre-stage (N2) that is configured to initiate a fetch of the identified instruction bundle from the second memory prior to the predetermined future processor cycle.

The plurality of stages for a thread in the second mode may comprise: a first stage (FT) that comprises determining if an instruction bundle for fetching from the second memory was initiated two processor cycles earlier at a first pre-stage (N1) and performing a second cycle of a multi-cycle second memory access; a second stage (FA) that comprises performing a third cycle of the multi-cycle second memory access; a third stage (FC) that comprises performing a fourth cycle of the multi-cycle second memory access; and a fourth stage (FS) that comprises sending the instruction bundle fetched from the second memory to a buffer for execution. The first pre-stage (N1) may be configured to occur prior to a corresponding first stage (FT) for that bundle such that the fetch of the identified instruction bundle from the second memory is completed during the third stage (FC). The second memory comprises a plurality of banks of memory, the method comprising fetching a second instruction bundle from a second bank of the second memory during a fetch of a first instruction bundle from a first bank of the second memory.

It may be identified that a first instruction bundle is to be fetched in a first predetermined future processor cycle from a first bank of the second memory; it may be identified that a second instruction bundle is to be fetched in a second predetermined future processor cycle from a second bank of the second memory; a fetch of the first identified instruction bundle from the first bank of the second memory may be initiated; and during the fetch of the first identified instruction bundle from the first bank of the second memory, a fetch of the second identified instruction bundle from the second bank of the second memory may be initiated.

It may be determined whether the second memory is available for the fetch of the identified instruction bundle from the second memory prior to the predetermined is future processor cycle; and if the second memory is available prior to the predetermined future processor cycle, the fetch of the identified instruction bundle may be initiated; and if the second memory is unavailable prior to the predetermined future processor cycle, the fetch of the identified instruction bundle may be skipped.

The first memory may be an instruction cache and the second memory may be an Instruction Scratchpad Random-Access-Memory (ISPRAM).

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
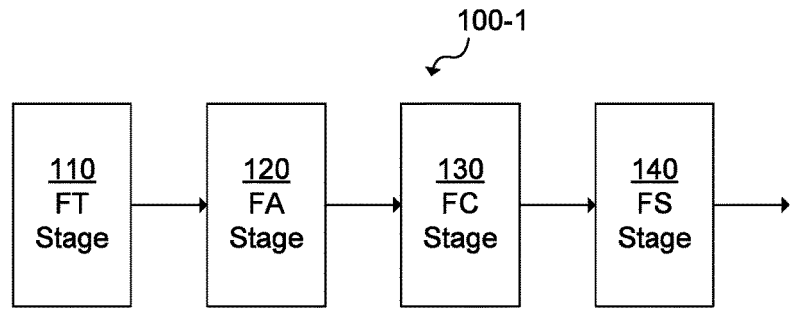
FIG. 1 shows a fetch procedure for fetching an instruction according to a first example.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

The approaches described in this document provide an improved approach to fetching instructions within an Instruction Fetch Unit (IFU) based on a Cache Memory and a multi-cycle on-chip high-speed local memory, such as an Instruction Scratchpad Random-Access Memory (IS-PRAM). In these approaches, a control module is configured to speculatively pre-empt the fetch of a particular instruction. Notably, access to the cache or to the ISPRAM may be initiated speculatively for a number of reasons. For example, it is possible to initiate a fetch for a thread based on a speculative determination that the thread will be selected for fetching in a future cycle. It is also possible to perform a prediction based upon an assumption that a sequential fetch is to be performed by default.

Using these approaches, collisions between different memory fetches are completely avoided, and throughput in the instruction fetch unit is much closer to ideal than the trivial approach explained above, since the likelihood that the instruction fetch unit must be halted is significantly low. In addition, the approaches described in this document can be readily integrated into existing instruction fetch units with minimal modification to the instruction fetch unit since they provide additional functionality without requiring significant restructuring of the instruction fetch unit. The additional pre-stages and surrounding capabilities can be readily added to a strongly verified or tested instruction fetch unit without the cost and time burden of re-testing the entire instruction fetch unit to the same degree.

Embodiments will now be described by way of example only.

An Instruction Fetch Unit (IFU) is an element of a Central Processing Unit (CPU) that is configured to fetch program instructions of a program that is being executed by the CPU based upon a program counter in the CPU. The IFU is configured to provide the fetched instructions to a buffer that stores program instructions fetched by the IFU until the instructions are to be executed by the CPU during the execution phase.

FIG. 1 illustrates an example fetch procedure 100-1 for fetching a program instruction bundle as performed by an IFU. Fetch procedure 100-1 may be performed by an IFU 200 in a CPU 250 and comprises a number of different stages, which will be described in more detail below.

Specifically, the fetch procedure 100-1 comprises a Fetch Thread Selection (FT) stage 110, a Fetch Address Selection (FA) stage 120, a Fetch Cache (FC) stage 130, and a Fetch Select (FS) stage 140.

In an example arrangement, the CPU may be a multi-threaded processor and so the IFU may be configured to select a thread for which instructions are to be fetched. This selection is performed in the first FT stage 110. In a multithreaded processing arrangement, each thread may be running a different program which each comprises a plurality of program instructions which are to be executed. Therefore, when the IFU fetches an instruction bundle associated with a thread, the IFU is fetching the next program instructions that are to be executed by the CPU for that thread.

The approach taken to select a thread in the FT stage 100-1 may be performed in a number of different ways. A round-robin selection may be used in which a single thread of the plurality of threads is selected for processing in a particular processor cycle and, in each subsequent processor cycle, one of the threads that was not selected is then chosen. This process is repeated until all the threads have been selected. In subsequent processor cycles, the threads are again selected in turn until all threads have been selected twice. In this way, all of the threads are given equal importance and are processed in a fair manner. This may be regarded as a scheduling scheme since each thread is effectively scheduled for processing in a future processor cycle.

An alternative scheduling scheme may be implemented when selecting threads during the FT stage 110 in which at least one thread is prioritised over other threads. This alternative scheduling scheme may be implemented by selecting a thread for processing more regularly than other threads of the plurality of threads. For example, where four threads are available for selection, it may be that a first thread is selected twice in every five processor cycles whereas other threads of the plurality of threads are only selected once.

Each thread can have an associated state which indicates whether the thread is fetchable or unfetchable. The state can vary throughout execution. A thread may be flagged as unfetchable due to one of a number of reasons, for example due to a cache miss, a Translation Lookaside Buffer (TLB) miss, or a full buffer in the execution stage (e.g. buffer 150). A thread may return to being fetchable, for example where buffer 150 is no longer full. A scheduling scheme (such as a round-robin scheduling scheme) would be able to select for processing a thread flagged as fetchable but may not select for processing a thread that is flagged as unfetchable. An unfetchable thread may therefore be skipped by the scheduling scheme and the next fetchable thread may instead be selected for processing. In a multithreaded processing arrangement, any combination of fetchability states would be possible.

In the fetch procedure 100-1, a particular thread is selected in the FT stage 110. After a particular thread has been selected in the FT stage 110, an instruction (or bundle of instructions) associated with that thread is to be fetched from memory and transferred for execution in the execution stage of the CPU (not shown in FIG. 1). Specifically, the bundle associated with the selected thread (i.e. the is next bundle of instructions to be fetched for execution for that thread) will be fetched from memory and stored in a buffer 150.

After a particular thread has been selected in the FT stage 110, the fetch procedure 100-1 advances in the next processor cycle to the FA stage 120. Specifically, an address indicating the location in memory of the instruction bundle that is to be fetched is selected in the FA stage 120.

The fetch address may be selected from different sources: the Program Counter (PC) for that thread, the target address of a branch/jump, predicted or calculated somewhere later in the pipeline, the redirect address after a mispredicted branch/jump, usually provided by the execution unit, etc. Then, the selected fetch address is incremented to index the next sequential instruction bundle and is stored in the PC. Note that the thread may use the PC next time it is selected in the FT stage, and that each thread needs its own Program Counter.

In the FC stage 130, an attempt to fetch the bundle of instructions from a first memory is initiated, using the address selected in the previous stage. Note that this access may be speculative, for example, if a sequential address is used for accessing the first memory before knowing if the previous bundle for the same thread contains a branch/jump instruction, or if the processor allows speculative execution after branches/jumps.

The first memory may be an instruction cache, which is a cache memory that stores a subset of instructions for retrieval by the IFU. The stored instruction may have associated therewith an index into the first memory and the instruction stored at that index is fetched based on the address selected in the FA stage. Usually, a tag associated with the address used to fetch the instruction from the first memory is compared with a corresponding tag stored along with the bundle of instructions in the first memory. In the event of a match between the tags, it is determined that a first memory hit has occurred and thus the bundle has successfully been fetched from the first memory. If the two tag values do not match, the fetch may be considered to be a first memory miss since the bundle that is to be fetched is not stored in the first memory. Accordingly, it may be necessary to retrieve the instruction from main memory, or from another memory. A first memory miss may be time consuming since the thread has already been uselessly handled for a number of processor cycles, and it may remain unable to progress (unfetchable) until the instruction is fetched from the other memory.

The reason for a potential first memory miss is that only a subset of the instructions is stored in the first memory, e.g. the instruction cache (not shown in FIG. 1). In the event of a first memory miss, the first memory may be updated to replace instructions stored in the first memory with other instructions that are more likely to be requested by the IFU. For example, instructions which are not predicted to be used in the near future may be replaced with instructions with a higher probability of being accessed next. The instruction cache may be a small memory which can be accessed very quickly. For example, the first memory may require a single processor cycle for an instruction to be fetched.

In addition to accessing the first memory, other structures may be accessed in parallel during the FC stage, such as a translation lookaside buffer (TLB) for translating from virtual to physical address or different Branch Predictor structures.

In the examples described herein, an instruction bundle stored in the first memory can be retrieved in a single processor cycle. In the event of a first memory hit, the fetch procedure 100-1 proceeds to the FS stage 140. In FS stage 140, the instruction bundle retrieved during the previous FC stage 130 associated with the thread selected during the FT stage 110 (three processor cycles earlier) is prepared to be passed to a buffer 150 for execution by the CPU in a subsequent stage of the CPU processing pipeline, i.e. a processing stage. In addition, the bundle of instructions may be pre-decoded in this stage for early detection and prediction of branch/jump instructions within the bundle, and this information could be bypassed to the FA stage.

Each stage in the example fetch procedure 100-1 takes a single processor cycle to perform and thus the fetch procedure 100-1 takes a total of four processor cycles, is which can be considered to be a fetch latency (of four cycles). The fetch latency can be considered to be the period of time between a thread being selected for fetching (e.g. in the FT Stage) and the fetched instruction bundle being issued to the buffer 150 for execution (e.g. in the FS stage).

Moreover, ideally, one new bundle of instructions is sent to the buffer in every cycle, i.e. a throughput of 1 bundle per cycle (except during the filling/emptying of the pipeline).

Figure 2:
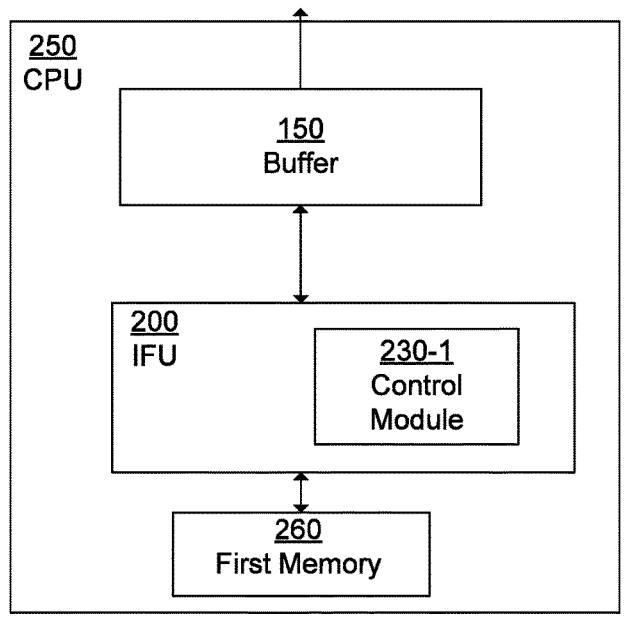
FIG. 2 shows a central processing unit according to a first example.

An Instruction Fetch Unit (IFU) 200 arranged within a central processing unit (CPU) 250 is illustrated in FIG. 2 according to an example. The CPU 250 comprises an IFU 200 comprising a control module 230-1, a first memory 260, and a buffer 150 configured to receive the fetched instruction bundles for execution. The CPU 250 of FIG. 2 is configured to perform the method described above with reference to FIG. 1, wherein each thread is always configured to perform a fetch of an instruction bundle from a first memory 260.

Table 1 below illustrates the processing of various threads through the fetch procedure of FIGS. 1 and 2. Specifically, Table 1 illustrates an arrangement in which the fetch procedure 100-1 is performed in an IFU that is part of a multithreaded processor that has four threads, namely thread 1 (T1) to thread 4 (T4). Each stage in the fetch procedure 100-1 is able to separately perform its function on instruction bundles each associated with respective threads during the same processor cycle. Accordingly, the example fetch procedure 100-1 of FIG. 1 is able to be concurrently processing a plurality of threads.

TABLE 1

Processing of multiple threads using the example fetch procedure 100-1 of FIG. 1 and a round-robin approach for selecting a thread for fetching at the FT stage.

|    | Cycle 1 | Cycle 2 | Cycle 3 | Cycle 4 | Cycle 5 | Cycle 6 | Cycle 7 | Cycle 8 | Cycle 9 | Cycle 10 |
|----|---------|---------|---------|---------|---------|---------|---------|---------|---------|----------|
| T1 | FT      | FA      | FC      | FS      | FT      | FA      | FC      | FS FT   | FA      | FC       |
| T2 |         | FT      | FA      | FC      | FS      | FT      | FA      | FC      | FS FT   | FA       |

TABLE 1-continued

Processing of multiple threads using the example fetch procedure 100-1 of FIG. 1 and a round-robin approach for selecting a thread for fetching at the FT stage.

|    | Cycle 1 | Cycle 2 | Cycle 3 | Cycle 4 | Cycle 5 | Cycle 6 | Cycle 7 | Cycle 8 | Cycle 9 | Cycle 10 |
|----|---------|---------|---------|---------|---------|---------|---------|---------|---------|----------|
| T3 |         |         | FT      | FA      | FC      | FS      |         |         |         | FT       |
| T4 |         |         |         | FT      | FA      | FC      | FS / FT | FA      | FC      | FS       |

In this example, the selection of a thread of the four threads to be processed during the FT stage 110 is performed using a round-robin approach in which thread T1 is selected in the FT stage 110 during the first processor cycle and thread T2 is selected in the FT stage 110 during the second processor cycle, which follows the first processor cycle. Similarly, threads T3 and T4 are selected in the FT stage 110 during the third and fourth processing cycles, respectively.

In the second processor cycle, thread T1 passes to the FA stage 120 where the address of the instruction bundle associated with thread T1 is selected and the PC for thread T1 is updated as described above. Also in the second processor cycle, thread T2 is selected for processing in the FT stage 110.

In the third processor cycle, thread T1 is passed from the FA stage 120 to the FC stage 130 where an instruction bundle identified by the PC for thread T1 is fetched from the first memory. In the third processor cycle, thread T2 passes from the FT stage 110 to the FA stage 120 and address selection is performed for the instruction bundle associated with thread T2. During the same cycle, thread T3 is selected for processing in the FT stage 110.

In the fourth processor cycle, the instruction bundle associated with thread T1 has been fetched from the first memory (assuming a hit) and is processed in the FS stage 140 so that it is prepared to be passed to the buffer 150 ready for execution in the execution stage of the CPU. In the fourth processor cycle, thread T2 is passed to the FC stage 130 where the instruction bundle associated with thread T2 is fetched from the first memory. Also in the fourth processor cycle, thread T3 is passed to the FA stage 120 for address selection and thread T4 is selected for processing in the FT stage 110.

In the fifth processor cycle, the processing of thread T1 has already completed the FS stage 140 and is in the buffer 150 for starting execution. Thread T1 is again selected for processing in the FT stage 110 in the fifth processor cycle due to thread T1 being the next thread to be processed in the round-robin arrangement operated in the FT stage 110.

Having been re-selected for processing, the next instruction bundle associated with thread T1 is to be fetched from the first memory. The fetch procedure 100-1 comprising the processing of a thread in each of the FT, FA, FC, and FS stages is initiated for thread T1 to enable the next bundle of instructions to be fetched. The other threads are passed through the fetch procedure 100-1 as described above in respect of thread T1. For example, the fetching of a first instruction bundle associated with thread T2 is completed in the fifth processor cycle and the fetching of a first instruction bundle associated with thread T3 is completed in the sixth processor cycle. In the sixth processor cycle, thread T2 is re-selected for processing in the FT stage 110 so that a next (second) bundle associated with that thread is fetched.

In the seventh processor cycle, the round-robin scheme would select T3 for processing in the FT stage 110 if it was fetchable, but the thread happens to be unfetchable at this moment (due to, for example, a full buffer 150 for this thread in the execution stage). Thus, the round-robin algorithm advances to the next thread (T4), which is currently fetchable, and starts its process in the FT stage 110, at the same time that the previous instance of the same thread (T4) finishes in the FS stage 140 its flow along the IFU.

In the eighth and ninth cycles T1 and T2 are selected again for processing in the FT stage 110, at the same time they finish the process of their previous instance in the FS stage 140.

Finally, in the tenth cycle, T3 is flagged as fetchable again (the buffer 150 is no longer full for this thread), thus the round-robin scheme selects it for processing in the FT stage 110.

In the example of Table 1 a throughput equal to 1 is reached in the IFU, as one new bundle of instructions is sent to the buffer in every cycle. Even in a single-cycle arrangement, or in a multi-cycle arrangement where only one thread is fetchable, a throughput of 1 bundle per cycle could be maintained as long as the sequential fetch is not interrupted for the thread (due to a taken branch, a redirect, etc.), in which case some accesses to the first memory might be stopped and a number of stall cycles might be added. In this way, each stage of FIG. 1 can be operating different fetches concurrently. Table 2 illustrates such scenario.

TABLE 2

Processing of a single thread using the IFU of FIGS. 1 and 2, where a thread requires back-to-back access.

|              | C1 | C2 | C3 | C4 | C5 | C6 | C7 | C8 |
|--------------|----|----|----|----|----|----|----|----|
| T1 Bundle 1  | FT | FA | FC | FS |    |    |    |    |
| T1 Bundle 2  |    | FT | FA | FC | FS |    |    |    |
| T1 Bundle 3  |    |    | FT | FA | FC | FS |    |    |
| T1 Bundle 4  |    |    |    | FT | FA | FC |    |    |
| T1 Bundle 5  |    |    |    |    | FT | FA | FC | FS |

The example of Table 2 above illustrates a multithreaded arrangement in which four threads are present. Thread 1 (T1) is flagged as fetchable along all cycles in the example, while the remaining threads (T2, T3 and T4) are flagged as not fetchable during the cycles shown in the example, and thus those 3 threads must be skipped by the round robin scheduling scheme. This multithreaded scenario is analogous to a single-threaded arrangement.

In the example of Table 2, thread T1 performs back-to-back fetching for several cycles. In the first cycle, thread T1 is selected in the FT stage 110. In the second cycle, the round-robin mechanism detects that threads T2, T3 and T4 are flagged as not fetchable, and thus selects T1 again in the FT stage 110, while the previous instance of this thread advances to the FA stage.

As explained above, in this scenario, back-to-back fetching for thread T1 only needs to stall when the sequential fetch is interrupted, for example, due to a taken branch or jump, due to a misprediction, etc. In the example of Table 2, this situation is illustrated in cycle 6, where a taken branch is detected and predicted within the instruction bundle currently at FS (Bundle 3). As such, fetch should continue from the target address of the branch. Notably, Bundle 4, currently in FC stage 130, is accessing the first memory (e.g. the instruction cache) using a sequentially incremented address, and thus it is incorrect. Therefore, this instance of thread T1 (Bundle 4) is killed at cycle 6 and thus it is not present in cycle 7, so an instruction bundle is not sent to the buffer 150 during that cycle, inserting a bubble in the flow and slightly degrading throughput. Moreover, Bundle 5 selects the fetch address in FA stage 120 during cycle 6. In this example implementation, the branch information is bypassed from FS to FA, and thus the target address for the branch is selected as the fetch address at cycle 6. As such, one cycle later (cycle 7), the correct bundle is fetched from the instruction cache in FC stage 130.

In the example implementation of Tables 1 and 2, it is assumed that all instruction bundles are to be fetched from a first memory, such as an instruction cache. Since the first memory is configured such that only a single processor cycle is required to fetch a bundle of instructions from the memory, there is no collision between the different threads and all of the threads arrive at FS stage 140 three processor cycles after having been selected for fetching in FS stage 110. However, in practice, the first memory, e.g. the instruction cache, does not include all possible instructions that are to be retrieved but rather only a subset of all possible instructions. As such, there is a possibility of a first memory miss where the instruction bundle that is to be fetched is not stored in the instruction cache and must be fetched from main memory. Whilst Table 1 illustrates an arrangement in which only first memory hits occur, there may still be collisions between fetches when a first memory miss occurs and the instruction bundle must be fetched from main memory. The fetch procedure described in FIG. 1 may avoid collisions in is such a scenario by flushing the thread from the IFU and changing its state to unfetchable when the first memory miss is detected, so that it cannot be selected by the FT stage, and returning the state to fetchable when the instruction bundle has been brought from main memory to the first memory. If the first memory hit rate is high enough, performance will not be too punished by this trivial approach.

In addition to the first memory (e.g. a Cache Memory), larger second memories can be included prior to Main Memory for the sake of improving performance. A typical solution in high-end designs is to include several larger cache levels (either on-chip or off-chip, and which in some cases can even be shared among several cores) that hold a larger subset of instructions. Also, another typical approach, especially used in embedded processors, is to include a Scratch Pad memory, which is a memory managed by software that stores all the instructions within a configurable address range. Even a combination of these two solutions is possible.

Figure 5:
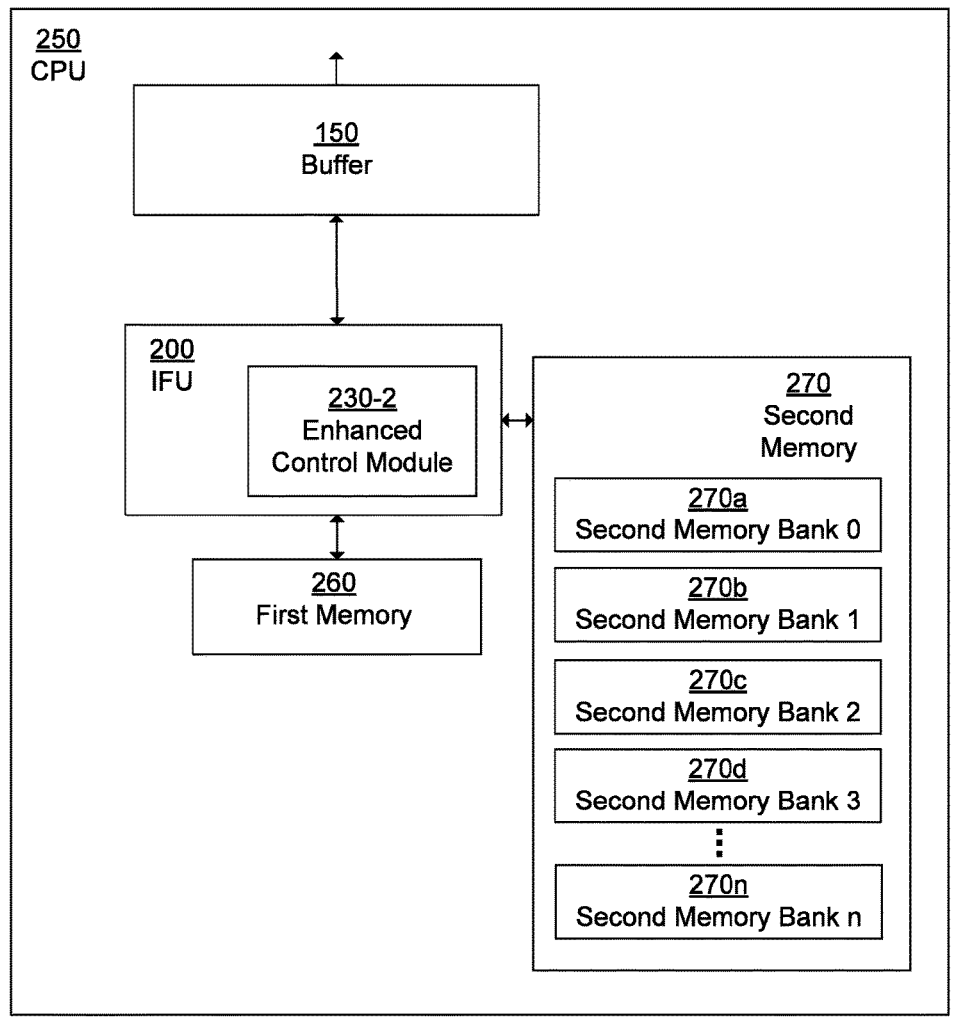
FIG. 5 shows a central processing unit according to a second example.

FIG. 5, discussed in more detail later, illustrates a CPU 250 that has corresponding features to the CPU of FIG. 2, with some changes. The CPU of FIG. 5 is configured to perform the methods described herein. Specifically, the CPU 250 of FIG. 5 further includes a second memory 270 and the IFU 200 of FIG. 5 comprises an enhanced control module 230-2 as described in further detail later. The IFU 200 of FIG. 5 is separately communicatively connected to the first memory 260 and the second memory 270. The IFU 200 is also communicatively connected to a buffer 150 that is configured to store instructions fetched by the IFU 200. The buffer 150 is communicatively connected to other modules (not shown) in the CPU that retrieve the fetched instructions stored in the buffer 150 and execute the instructions.

The first memory 260 is a memory that can be accessed quickly (in the example of FIGS. 2 and 5, an Instruction Cache), for example in a single processor cycle, that is configured to store a list of program instructions that are to be fetched by the IFU 200. The first memory may require a plurality of processor cycles, for example a different number or fewer processor cycles than an access to the second memory.

The second memory 270 is also a memory that is configured to store program instructions that are to be fetched by the IFU 200. The second memory 270 may require a predetermined plurality of processor cycles to fetch an instruction bundle therefrom since the second memory 270 may be larger than the first memory 260. In the example of FIG. 5, the second memory 270 is an Instruction Scratchpad RAM (ISPRAM) which requires four processor cycles to fetch an instruction bundle therefrom. It will be appreciated that the number of processor cycles needed to fetch an instruction bundle from the memory will depend upon the size of the memory and thus does not need to be four processor cycles. The number of processor cycles needed to fetch an instruction bundle can take any value.

In the example of FIG. 5, both the first and the second memory are part of the first level of the memory hierarchy. As explained above, the second memory (ISPRAM) contains all the instructions within a (configurable) address range, so that a thread fetching an address within this range should access the ISPRAM. Conversely, a thread fetching an address from outside that range should try to find the instruction bundle in the Instruction Cache, where it could miss, in which case it would access Main Memory.

Due to the difference in the number of processor cycles needed to fetch an instruction bundle from the first memory 260 or the second memory 270, collisions may occur between instruction bundles that were requested from the two different memories at different times. As such, two different instruction bundles, each associated with a different thread and each fetched from a different memory at a different time, may arrive at the FS stage 140 at the same time. An example arrangement for first and second memories in which a collision between different threads occurs is illustrated in relation to Table 2 below.

TABLE 3

Processing of multiple threads using the example fetch procedure 100-1 in which instruction bundles are fetched from both first and second memories.

|    | Cycle 1 | Cycle 2 | Cycle 3 | Cycle 4 | Cycle 5 | Cycle 6 | Cycle 7 |
|----|---------|---------|---------|---------|---------|---------|---------|
| T1 | FT      | FA      | FC1     | FC2     | FC3     | FC4     | FS      |
| T2 |         | FT      | FA      | FC      | FS      | FT      | FA      |
| T3 |         |         | FT      | FA      | FC      | FS      | FT      |
| T4 |         |         |         | FT      | FA      | FC      | FS      |

As with the arrangement described above with reference to Table 1, in the arrangement of Table 3 threads T1 to T4 are to be processed using a round-robin schedule in which T1 is selected for processing during FT stage 110 in the first processor cycle. In this example, the instruction bundle associated with thread T1 which is to be fetched is stored in the second memory. In the example of Table 3, four processor cycles are required to fetch the instruction bundle from the second memory.

In the first processor cycle, thread T1 is selected for processing in the FT stage 110. Thread T1 is passed to the FA stage 120 to be processed in the second processor cycle as described above. In the third processor cycle, the fetch of the instruction bundle associated with thread T1 is initiated in the FC stage 130. Table 3 illustrates four fetch cycles that are performed for thread T1 during the third to sixth processor cycles, namely; first fetch cycle FC1, second fetch cycle FC2, third fetch cycle FC3, and fourth fetch cycle FC4. Since four processor cycles are required to complete a fetch of an instruction bundle from the second memory, the instruction bundle fetched from the second memory is passed to the FS stage 140 to be prepared for execution in the seventh processor cycle, as shown in Table 3.

In the example of Table 3, threads T2 to T4 require instruction bundles which are stored in the first memory and thus the instruction bundle associated with each of threads T2 to T4 can each be fetched during a single processor cycle. In this example arrangement, access to the first memory is independent of access to the second memory. As such, it is possible for an instruction bundle associated with a thread to be fetched from the first memory whilst an instruction bundle associated with a different thread can be fetched from the second memory during the same processor cycle.

In Table 3, threads T2 to T4 are therefore processed in a similar manner to the corresponding threads T2 to T4 described above in relation to FIG. 1. Accordingly, a fetched instruction bundle associated with thread T2 is passed to the FS stage 140 in the fifth processor cycle and a fetched instruction bundle associated with thread T3 is passed to the FS stage 140 in the sixth processor cycle.

In the seventh processor cycle, the instruction bundle associated with thread T4 is passed to the FS stage 140 in the same processor cycle as the instruction bundle associated with thread T1 that has been fetched from the second memory is passed to the FS stage 140. The two instruction bundles arrive at the FS stage at the same time due to the delay in the instruction bundle associated with thread T1 being fetched from the second memory. The instruction bundle obtained from the second memory for thread T1 is therefore available at the FS stage 140 at the same time as the instruction bundle obtained from the first memory for thread T4, creating a structural hazard. Thus, if not handled conveniently, this could lead to one of the two instruction bundles being lost or discarded or an erroneous result being issued by the IFU to the buffer 150.

More generally, a collision may arise due to one thread of a plurality of threads requiring an instruction bundle from a memory that requires only a single processor cycle to access the instruction bundle whilst another thread requires an instruction bundle from a memory that requires multiple processor cycles to access the instruction bundle. Put another way, for one thread a single-cycle request is made and for another thread a multi-cycle request is made.

One trivial approach to solve the problem is to stall the IFU whilst the multi-cycle request takes place. When the IFU is stalled, no new threads are selected and no new requests for instruction bundles are issued whilst the second memory is being accessed and the fetch procedure waits for the instruction bundle fetched from the second memory to reach the FS stage 140 before resuming the fetch procedure 100-1. By stalling the fetch procedure in this way, collisions between different threads are avoided. However, this approach leads to significant performance degradation which in many implementations may be unacceptable.

Higher performance solutions than this trivial approach are possible. For example, access to the conflicting stage (FS) could be arbitrated when two threads arrive at the same time, allowing one thread to proceed and buffering the other. The buffered thread must find a cycle for continuing its flow along the pipeline, so the thread scheduler must be enhanced (i.e. a bubble would have to be introduced at FT in the convenient cycle for allowing the buffered thread to re-enter the pipeline without colliding with another thread). Besides, in the cycle when the thread accessing the second memory arrives at FC, a bubble will be inserted in the IFU unless another thread accessing the first memory was also scheduled at FT two cycles ago, which would complicate not only the thread scheduler within FT stage but also FA and FC stages. Therefore, this solution involves high complexity and a high amount of additional logic and storage elements, and, importantly, throughput could be harmed and broad modifications have to be carried out in an IFU, which can be complex and time-consuming.

The present disclosure relates to a solution which is described below and provides high throughput with limited hardware modification of a baseline IFU. Specifically, a number of pre-stages are added where multi-cycle accesses are conveniently pre-scheduled and started in-advance. Then, FT, FA, FC and FS stages are performed for all threads, with slight differences depending if the thread fetches its bundle from the first or the second memory, as will be detailed later. As described herein, this approach is able to naturally avoid collisions and still achieve a high throughput under most scenarios (even in the extreme situation of only one active thread fetching from the second memory), it distributes the system fairly among the threads, it can be adapted to any ISPRAM size or any pipeline depth, and it involves minor changes in the original pipeline.

Figure 3:
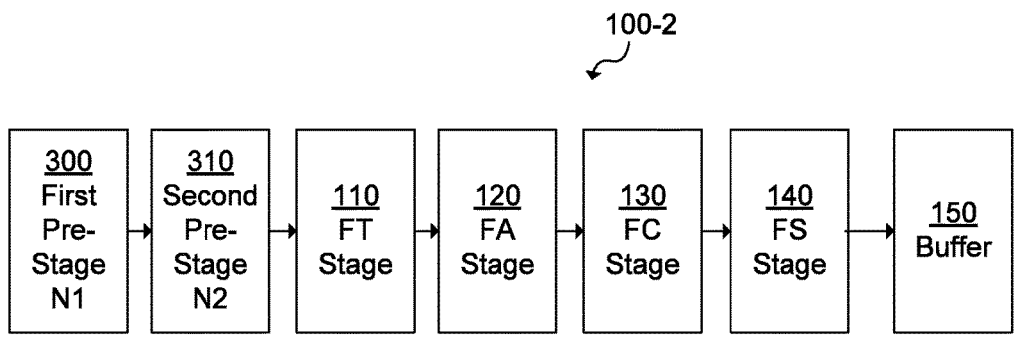
FIG. 3 shows a fetch procedure for fetching an instruction according to a second example.

FIG. 3 illustrates such an example fetch procedure. The alternative fetch procedure 100-2 includes two additional stages, namely first 300 and second 310 pre-stages that occur prior to FT stage 110. These new pre-stages operate in parallel and on the same threads but a predetermined number (e.g. two/one cycles is respectively) before the FT stage begins processing the threads for fetching. The main task of the first 300 and second 310 pre-stages is to initiate a fetch for an instruction bundle from the second memory 270, if required.

The decision of a thread requiring access to the first or the second memory could be handled in different ways. In the present example, a thread may operate in one of two modes; namely a first mode, referred to in these examples as an instruction cache mode (I$-mode), and a second mode, referred to in these examples as an instruction scratchpad mode (ISP-mode). A thread is in one of the two modes at a given time, and it can dynamically change between modes during its execution. When the thread is in the first mode (I$-Mode), the instructions are fetched from the first memory (e.g. the instruction cache), whereas when the thread is in the second mode (ISP-Mode), the instructions are fetched from the second memory (e.g. the ISPRAM).

The second memory (e.g. the ISPRAM) contains all the instructions within a (configurable) address range, while the rest of the instructions are stored in Main Memory, being a dynamically changeable subset of the instructions stored in the first memory (e.g. the instruction cache). Therefore, one approach for detecting from which memory an instruction for a selected thread is to be fetched (i.e. the mode for the thread) is to compare the fetch address of the instruction with the address range which falls within the second memory 270.

In some examples, both the first memory (instruction cache) and the second memory (ISPRAM) are virtually-indexed and physically-tagged. Thus, address comparison is performed between the physical fetch address of the thread and the address range which falls within the second memory 270. In the present example, it is assumed that the FC stage includes a translation lookaside buffer (TLB), so the address comparison is performed at the FC stage, where the physical address is already available after translation. In case of a match between the fetch address and the address range mapped to the second memory, the thread is considered to be fetching in ISP-Mode, where instruction bundles are fetched from the second memory. Otherwise, the thread is considered to be fetching in I$-Mode, where is instructions are fetched from the first memory.

A mode-change occurs when instructions for a thread are being read from either the first or second memory and it is detected (at the FC stage) that instructions for that thread are mapped to the other memory (e.g. second or first memory). A mode-change stops the fetch for the thread and conservatively kills all stages of the fetch procedure where the thread is presently being processed, and then restarts the fetch for the thread in the correct mode. Thus, for performance not to be degraded, mode-changes should not occur frequently.

If a thread is in the first mode (I$-Mode), the next instruction bundle is to be fetched from the first memory 260, and the fetch procedure 100-2 operates on that thread in a similar manner as described above in relation to FIG. 1. Specifically, in the FT stage 110 a thread is selected for processing and the stages 120 to 140 are performed as described above.

However, if a thread is in the second mode (the ISP-Mode), the next instruction bundle is to be fetched from the second memory 370. Given that fetches from the second memory take multiple processor cycles, it is useful to know whether a thread in the second mode is to be selected in a future processor cycle to allow a fetch for that thread to be pre-emptively initiated. As such, in the present example (where four processing cycles are needed to fetch from the second memory, thread selection is performed at the FT stage, and the fetched bundle of instructions is prepared at the FS stage, three cycles after FT stage), a prediction is made in the first pre-stage 300 as to which thread will be selected in the FT stage 110 two processor cycles into the future. In the event that the predicted thread is in ISP-Mode, an early speculative fetch is initiated from the second memory 270, that makes it possible for the instruction bundle to be available in the FS stage 140 at the correct time for that thread, which is the time at which the thread would reach the FS stage 140 were an instruction bundle associated with that thread being accessed from the first memory using the approach set out in respect of FIG. 1.

In general, a prediction is made at processor cycle m as to which of the threads will be selected at a predetermined future processor cycle m+δ, where δ represents an offset of the number of processor cycles based upon the required delay to avoid a collision, thereby ensuring that an instruction bundle from the second memory will arrive for further processing in the appropriate processor cycle.

The value assigned to δ will depend upon several factors that relate to the configuration of the IFU. One factor is the predetermined plurality of processor cycles required to fetch an instruction from the second memory (four in our example). Another factor is the fetch latency of the IFU, defined as the number of cycles from the selection of the thread for processing and the completion of the fetch of the instruction bundle (four in our case, given that the thread is selected at FT and it is issued at FS, after going through FA and FC). The access time of the second memory may be aligned with the length of the fetch procedure or the length of the fetch procedure may be aligned with the access time of the second memory, by simply adding/removing a number of pre-stages. For example, where the length of the fetch procedure is reduced in one cycle, an additional pre-stage could be added to initiate a fetch of an instruction from memory an additional processor step early to ensure that the fetch of the instruction is available in the correct cycle. Alternatively, where the access time of the second memory is reduced in one cycle, it is possible to remove one pre-stage so that the first pre-stage 300 occurs one processor cycle prior to FT stage 110 and access to the second memory is started simultaneously with FT stage 110. Even in the extreme case where access time of the second memory was reduced to only 2 cycles, the solutions explained in the present document would be applicable. In this case, however, the first pre-stage would be simplified, as it would occur simultaneously to FT, being the thread predictor unnecessary and thus substituting it with the thread scheduler itself. The value of δ may therefore vary based on the specific implementation of the fetch procedure, e.g. based upon the size of the second memory and the number of steps in the fetch procedure 100.

Figure 4A:
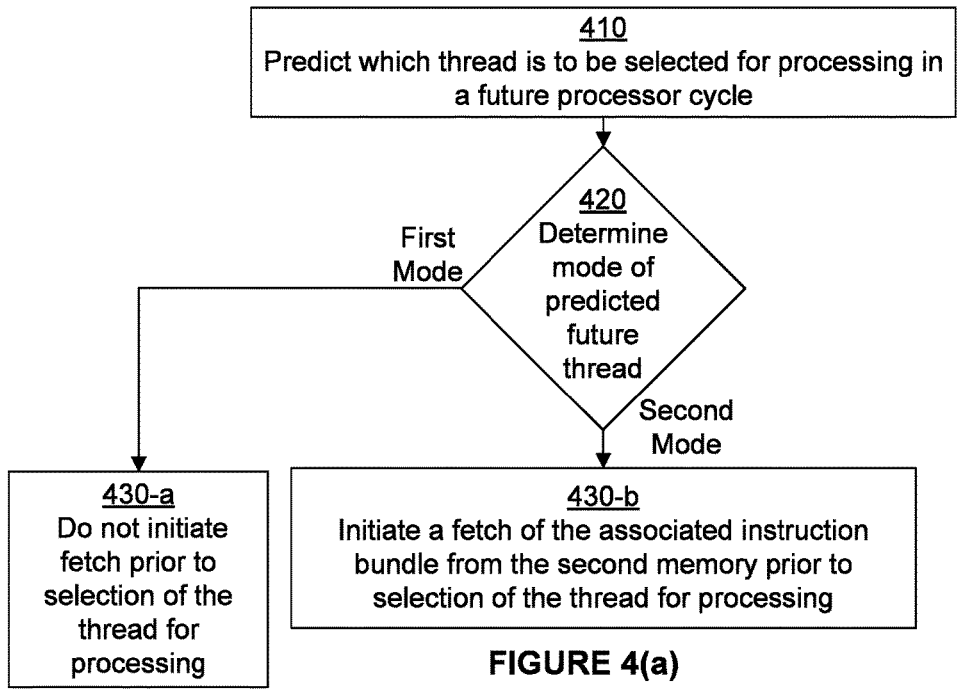
FIGS. 4(a) and 4(b) illustrate example methods for initiating a fetch of an instruction from a second memory.

FIG. 4(*a*) shows a flowchart illustrating an example method of operation of the first pre-stage 300. An illustration of this method of operation in relation to the fetch procedure of FIG. 3 will now be described with reference to FIGS. 3 and 4 and Table 4 below.

TABLE 4

Processing of multiple threads using first and second pre-stages.

|  | Cyc 1 | Cyc 2 | Cyc 3 | Cyc 4 | Cyc 5 | Cyc 6 | Cyc 7 | Cyc 8 | Cyc 9 | Cyc 10 |
|---|---|---|---|---|---|---|---|---|---|---|
| T1 (I$) | FT | FA | FC<br>N1 | FS<br>N2 | FT | FA | FC<br>N1 | FS<br>N2 | FT | FA |
| T2 (I$) | N2 | FT | FA | FC<br>N1 | FS<br>N2 | FT | FA | FC<br>N1 | FS<br>N2 | FT |
| T3 (ISP) | N1 | N2<br>(FC1) | FT<br>(FC2) | FA<br>(FC3) | FC<br>(FC4)<br>N1 | FS<br>(FC1)<br>N2 | FT<br>(FC2) | FA<br>(FC3) | FC<br>(FC4)<br>N1 | FS<br>(FC1)<br>N2 |
| T4 (I$) |  | N1 | N2 | FT | FA | FC<br>N1 | FS<br>N2 | FT | FA | FC<br>N1 |

In the example illustrated in Table 4, threads T1, T2, and T4 are currently fetching instruction bundles from the first memory 260 (i.e. they are in the first mode, the I$-Mode). Thread T3 is currently fetching instruction bundles from the second memory 270 (i.e. it is in ISP-Mode).

Threads T1, T2, and T4 are processed as described above with reference to FIG. 1. In the FT stage 110 each thread is selected in turn for processing using a round-robin scheme. For example, threads T1 and T2 are respectively selected for processing in the first and second processing cycles and are passed through the fetch procedure 100-2 as described above for FIG. 1.

At the third processing cycle, an instruction bundle associated with thread T1 is fetched from the first memory 260. The fetched instruction bundle for thread T1 is processed in the FS stage 140 prior to being passed to a buffer 150 for execution. Threads T2 and T4 are processed in a corresponding manner to thread T1, whereby the associated instruction bundles are fetched from the first memory 260 when the threads are selected for processing in the second and fourth processing cycles, respectively.

In accordance with step 410 of FIG. 4(*a*), in the first pre-stage 300 a prediction as to which thread will be selected for processing two cycles later (in FT) is made. Where a round robin scheduling scheme is implemented, the prediction would be based upon the thread that is due to be selected in a future cycle according to that scheme and some other features (such as fetchability of the threads). Note that such decision can be considered to be non-deterministic since, as explained above, the round-robin scheme selects among the current group of fetchable threads, and the thread fetchability state can vary throughout execution.

At step 420 of FIG. 4(*a*), a determination is made as to which mode (the first mode or the second mode) the predicted future thread is operating in. If in the first pre-stage 300 the predicted thread is determined to currently be in the second mode (the ISP-Mode), the first pre-stage 300 schedules the initiation of a fetch of the associated instruction bundle from the second memory 270 for the subsequent processor cycle, in accordance with step 430-*b* of FIG. 4(*a*), and initiates a fetch of the instruction bundle from the second memory using the program counter (PC) for that thread in the second pre-stage 310, prior to the selection of the thread in the FT stage 110 of the predetermined future cycle.

The address used for initiating an access to the second memory in the first pre-stage can be regarded as a "Fetch Address" signal. This is because the input to the second memory can, in some arrangements, be the output to another multiplexor (not shown) configured to receive a plurality of inputs, each of which is a value from a respective program counter for a thread of the plurality of threads. The multiplexor may be controlled by the predicted thread at the first pre-stage. Additionally, the input to the cache fetch can be considered to be a "Fetch Address" signal which, in this case, is selected in the FA stage as explained above. Note that selection of the "Fetch Address" in the first pre-stage is easier than selection of "Fetch Address" in the FA stage.

After using the PC for initiating a fetch for an instruction bundle from the second memory, the PC of the selected thread is incremented to index the next sequential instruction bundle, for it to be used by the same thread the next time it is selected at the first pre-stage, since, by default, a thread is speculatively fetched sequentially. Notably, when an interrupt in the sequential fetch is detected for a thread (for example, due to a taken branch), the enhanced control module 230-2 must stop all pending fetches to the second memory for that thread and redirect it through the correct path (similarly to the original pipeline).

In the event that the thread predicted in the first pre-stage 300 is a thread in the first mode (the I$-Mode), a fetch from the second memory would not be scheduled and initiated early (430-*a*) and no action would be taken in the first pre-stage 300.

Note that, if the tasks to be accomplished in the first pre-stage 300 could not be achieved in a single processor cycle, they could be distributed in two or more pre-stages, by dividing the first pre-stage into a number of pre-stages, for example two pre-stages (first pre-stage-a and first pre-stage-b), each requiring one processor cycle. For example, during the first pre-stage-a, the thread that would be selected in a future cycle could be predicted and its mode (first or second) be determined (410 and 420 of FIG. 1-*a*), whereas, during the first pre-stage-b, the Fetch Address for accessing the second memory could be selected for initiating the fetch of the associated instruction bundle from the second memory (430-*b* of FIG. 1-*a*).

Two cycles after the first pre-stage, threads (both in the first or the second mode) flow through the FT, FA, FC and FS stages as described with respect to FIG. 1, with some differences (detailed below) in the specific tasks performed at each stage depending on the mode for the thread. Since the first pre-stage 300 schedules and the second pre-stage 310 initiates the fetch from second memory 270 for a thread in ISP-mode early enough, the instruction bundle for such thread is available in time for it to be processed at the FS stage 140, similarly to a thread in the first mode. As such, the structural hazard at the FS stage is completely avoided.

Figure 6:
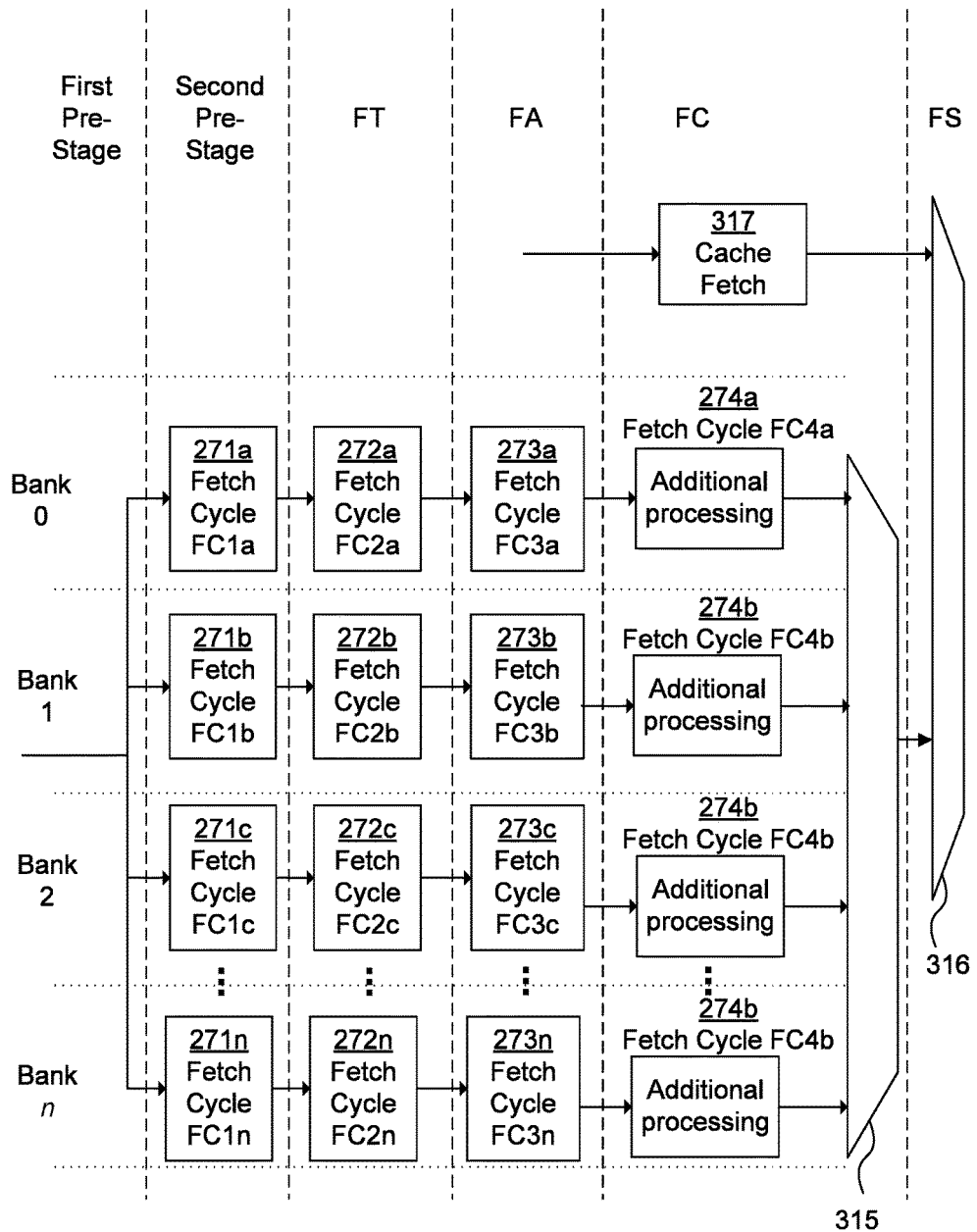
FIG. 6 shows example timing of multi-cycle access to banks of second memory.

When modifying a prior IFU configuration (such as the IFU illustrated in FIGS. 1 and 2) to introduce this functionality, the control module 230-1 is modified to form an enhanced control module 230-2 as illustrated in FIG. 5. In detail, the FT, FA, FC and FS stages require only minor changes for including the capability to process threads in ISP mode as described herein. Specifically, FT requires minor changes for detecting if threads in the second mode (ISP-Mode) are ready to be selected or not. In addition, it must determine if the prediction performed at N1 (i.e. the first pre-stage) was correct or not, and take convenient actions (as explained in more detail below). As for the FA stage, address selection is skipped for threads in the second mode, as the fetch address for a thread in that mode was already selected in the first pre-stage. At FC, when a thread is in the second mode (ISP-Mode), access to the instruction cache must be gated. Moreover, comparison between the physical address and the address range which falls within the second memory is carried out, which could trigger a mode change for the thread. The other structures accessed in the FC stage, like a translation lookaside buffer (TLB) for translating from virtual to physical address or the different Branch Predictor structures, are accessed like in the prior pipeline of FIG. 1 regardless of the mode (I$/ISP) for the thread. Finally, the FS stage requires the inclusion of a new multiplexor 316 (FIG. 6, described later in more detail) for selecting the bundle from the first or second memories depending on the mode (I$/ISP) for the thread As can be seen in FIG. 6, the multiplexor 316 may select from the output of a cache fetch 317 performed during the FC stage or the output of a second memory fetch.

In the specific example of Table 4, during the first cycle, in the first pre-stage 300 it is predicted that (in accordance with step 410 of FIG. 4(*a*)) in a predetermined is future processor cycle, namely the third processor cycle, thread T3 will be selected for processing in the FT stage 110 based upon a round-robin procedure being performed. Given that this thread is currently in ISP-Mode (a check performed in accordance with step 420), the first pre-stage 300 schedules (in accordance with step 430-*b* of FIG. 4(*a*)) a fetch from second memory 270 such that the fetch of the instruction bundle from the second memory 270 is initiated in the subsequent processor cycle and is completed by the fifth processor cycle.

In Table 4, the operation performed by the first pre-stage 300 is indicated by N1 and the operation performed by the second pre-stage 310 is indicated by N2. More specifically, in the first processor cycle the first pre-stage 300 is configured to predict a thread that will be selected in the FT stage 110 for processing in the third processing cycle, i.e. in the processing cycle that is two processor cycles into the future. The first pre-stage 300 is able to make this prediction since in the FT stage 110 a round-robin scheduling process is used and, at each processor cycle, the selected thread will depend on the threads selected in previous processor cycles (as well as other factors like the fetchability of each thread).

Having predicted in the first processing cycle that thread T3 will be selected for processing in the third processing cycle and consequently scheduled thread T3 for processing, a fetch of an instruction bundle from the second memory 270 is initiated in the second processing cycle at the second pre-stage 310. The first fetch cycle from the second memory 270 is indicated in Table 4 by FC1 and occurs during the second processing cycle in the second pre-stage 310.

In the third processing cycle, thread T3 is selected for processing in the FT stage 110. Accordingly, it is determined that the prediction made in the first pre-stage 300 is correct. Also, during the third processing cycle, the second fetch cycle FC2 from the second memory 270 is performed in parallel with the selection of the thread in the FT stage 110. In the fourth processing cycle, thread T3 is processed in the FA stage 120. In parallel with thread T3 being processed in the FA stage 120, the third fetch cycle FC3 from the second memory 270 is performed for thread T3.

In the fifth processing cycle, a number of operations are performed at FC in relation to thread T3. Specifically, the fourth fetch cycle FC4 from the second memory 270 is performed. Accordingly, at the end of the fifth processing cycle, the fetch from the second memory 270 is completed and the second memory 270 is then freed so that it is made available for access by another thread (or the same thread in a subsequent access). Note that during this stage (FC) an access to the first memory would be initiated. However, since the fetch is already underway for thread T3 from the second memory, it is not necessary for the first memory fetch to be initiated and it can just be gated.

Moreover, during the fifth processor cycle, in the first pre-stage 300 a prediction as to which thread will be selected in the seventh processing cycle is made and it is determined that thread T3 will be selected for processing in the seventh processing cycle. A next instruction bundle associated with thread T3 will therefore be fetched, i.e. a second bundle associated with thread T3. Since the fetch of a first bundle associated with thread T3 has been completed at the end of the same processing cycle, i.e. the fifth processing cycle, it is possible to initiate the fetch of the second bundle associated with thread T3 in the sixth processing cycle from the second memory 270 as indicated at N2.

The second instruction bundle to be fetched for thread T3 is fetched from the second memory in the same manner as for the first instruction bundle for thread T3 wherein the four fetch cycles (FC1 to FC4) are completed prior to the instruction bundle being passed to the FS stage 140.

In the sixth processing cycle, the instruction bundle fetched in the second to fifth processing cycles for T3 is passed to the FS stage 140 and prepared for execution before being placed in buffer 150. Given that the thread is at ISP-Mode, at FS the instruction bundle passed to the buffer is selected from the second memory and not from the first one.

The above arrangement allows an instruction bundle to be fetched from the second memory in a multi-threaded arrangement without hampering the capability of single-cycle fetches to a first memory to be performed for the other threads. As such, collisions between threads at the FS stage 140 are avoided without impacting the throughput achieved in the IFU. The arrangement set out in respect of FIGS. 3 and 4(*a*) ensures that collisions are prevented in the event that a single thread of the plurality of threads requires access to the second memory whilst the other threads require access to the first memory. Accordingly, collisions at the FS stage are completely avoided.

A further structural hazard that may occur in the fetch procedure of FIGS. 3 and 4(*a*) is that a second thread (or another selected instance of the same thread) requires a respective instruction bundle to be fetched from the second memory whilst the second memory is being accessed by a first access. Accordingly, collisions may arise since the second memory may be configured to allow only a single access to the second memory at a given time. Note that the colliding accesses can come from different threads (i.e. more than one thread in the second, ISP-Mode, at the same time) or even from the same thread (if the number of fetchable threads, which can change along execution, is smaller than the number of cycles required for accessing the second memory, two accesses would collide in the second memory for the same thread, assuming the use of a round-robin scheme for selecting the thread at FT). Such scenario could be handled in a number of different ways.

For example, it is possible for a particular thread in ISP mode to be skipped or delayed if the second memory 270 is being already accessed to fetch an instruction bundle for a different thread (and is thus unavailable) at the time when the particular thread is selected for processing. As such, with reference to FIG. 4(*b*), as well as determining the mode of the predicted future thread at step 420-*a* (as with step 420 of FIG. 4(*a*)), at step 420-*b* a further check may be performed to determine if the second memory from which the future thread requires a fetch, is available prior to initiating a fetch to the second memory. Then, at the first pre-stage 300, a prediction of a thread in the second mode, ISP-Mode, will only start access to the second memory when the memory is determined to be free by step 420-*b*. As explained before, at the FT stage, a thread in the second mode is selected for processing only when access to the second memory was started two cycles earlier. In the event that the second memory is not free, the early initiation of a fetch for that thread is skipped and a different thread may need to be selected in the FT stage.

However, this solution can degrade performance when several accesses to the second memory collide. For reducing the impact, a further implementation is set out below. In this approach, the second memory 270 is divided into n banks that can each be individually accessed. As explained in the previous paragraph, at step 420-*b* it is checked if the instruction bundle is to be fetched from a memory bank that is available, in which case access to the second memory is scheduled for the thread at the first pre-stage 300. This solution is described in more detail below with reference to FIGS. 5 and 6.

FIG. 5, as described earlier, illustrates a CPU in which the second memory 270 is separated into a plurality of banks 270a-270n. In the example of FIG. 5, the second memory 270 comprises at least four independently accessible memory banks 270a to 270d. At the output of the second memory 270 is a multiplexor (not shown) which is configured to select an instruction bundle from one of the memory banks 270a to 270d to be output to the FS stage 140 for processing. Between the memory banks and the multiplexer, or at the output of the multiplexer, there may also be provided a buffer (not shown) which is configured to store the fetched instruction bundles until that instruction bundle is to be sent to the FS stage 140 for further processing.

FIG. 6 includes a diagram illustrating the timing of multi-cycle access to the banks of second memory 270 at each stage of the fetch procedure 100-2 described in FIG. 3. The second memory 270 comprises a first bank of memory (Bank 0) that requires three fetch cycles to access an instruction bundle and a fourth cycle to select the bank and to perform additional processing, such as an ECC check. As such, the initiation of a fetch to Bank 0 results in that second is memory bank being unavailable for a subsequent fetch for a total of three processor cycles (note that the bank of memory could be accessed during the FC4x stage). The total number of processor cycles until the fetch is completed and the bundle of instructions is available is four cycles in this example. The four processor cycles to complete a fetch are termed first to fourth fetch cycles FC1a to FC4a indicated by reference numerals 271a to 274a in FIG. 6.

The second memory 270 further comprises a second bank of memory (Bank 1) that can be accessed using first to fourth fetch cycles FC1b to FC4b indicated by reference numerals 271b to 274b. A third bank of memory (Bank 2) is also illustrated which can be accessed using first to fourth fetch cycles FC1c to FC4c indicated by reference numerals 271c to 274c. The second memory 270 further comprises any number of other banks which can each be accessed using first to fourth fetch cycles FC1n to FC4n indicated by reference numbers 271n to 274n. In other implementations, a different number of banks and fetch cycles may be implemented depending on the size of the second memory and the bank size selected.

Since each bank of the second memory 270 can be accessed independently of the other banks, it is possible to allow a first access to one of the banks of the second memory 270 to be processed whilst simultaneously allowing a second access to another, different bank of the second memory 270. In this way, even if one of the threads of a plurality of threads is accessing, over multiple processor cycles, a bank of the second memory 270, other threads, or even the same thread, which require access to the different banks of the second memory may still be able to access the second memory without the need to stall the IFU 200 or for a thread to be skipped from selection. A fetch procedure for the arrangements of FIGS. 5 and 6 will now be illustrated with reference to Table 5.

TABLE 5

Processing of multiple threads using first and second pre-stages where two threads require access to the second memory.

| | C1 | C2 | C3 | C4 | C5 | C6 | C7 | C8 | C9 | C10 |
|---|---|---|---|---|---|---|---|---|---|---|
| T1 (I$) | FT | FA | FC N1 | FS N2 | FT | FA | FC N1 | FS N2 | FT | FA |
| T2 (I$) | N2 | FT | FA | FC N1 | FS N2 | FT | FA | FC N1 | FS N2 | FT |
| T3 (ISP) | N1 | N2 (FC1a) | FT (FC2a) | FA (FC3a) | FC (FC4a) N1 | FS (FC1b) N2 | FT (FC2b) | FA (FC3b) | FC (FC4b) N1 | FS (FC1c) N2 |
| T4 (ISP) | | N1 | N2 (FC1b) | FT (FC2b) | FA (FC3b) | FC (FC4b) N1 | FS (FC1c) N2 | FT (FC2c) | FA (FC3c) | FC (FC4c) N1 |

Figure 4B:
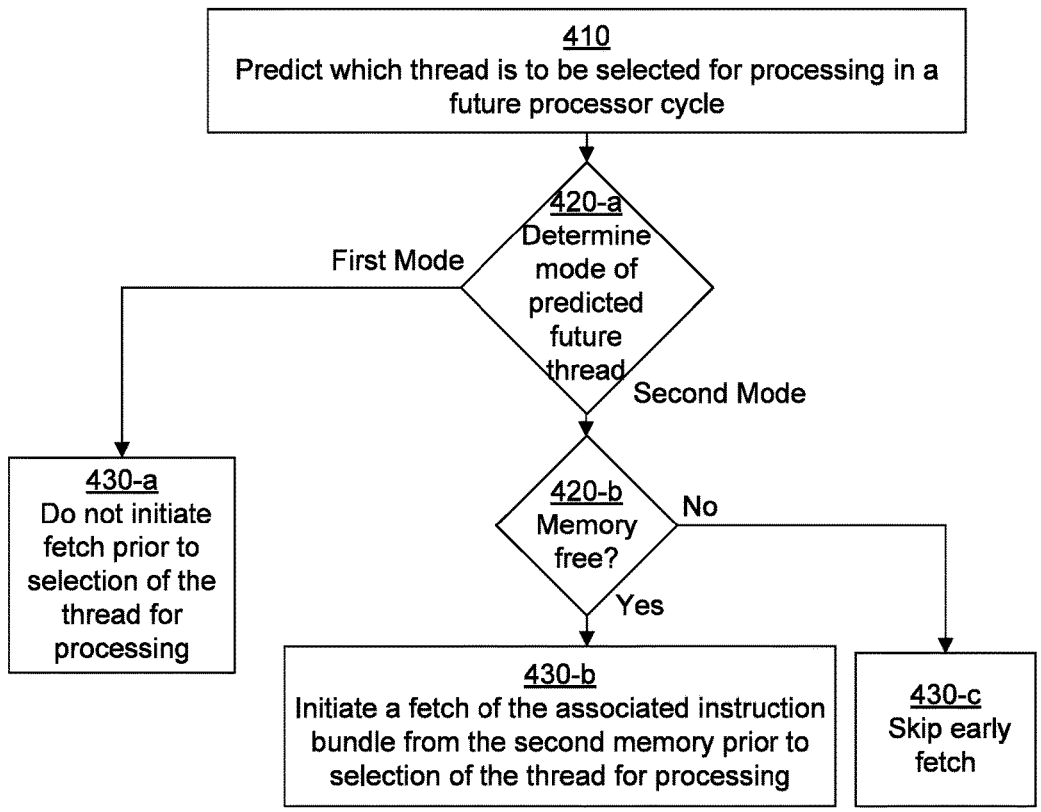

Table 5 illustrates an arrangement based on FIGS. 4(b), 5 and 6 in which four threads (threads T1 to T4) are to be processed. In this arrangement, two of the four threads, namely threads T1 and T2, each require instructions stored in the first memory 260 to be fetched (I$-Mode). The other two threads, T3 and T4, each require instructions stored in the second memory 270 (ISP-Mode). Threads T1 and T2 are selected for processing in first and second processing cycles respectively, as previously described with reference to FIG. 3.

Threads T3 and T4 are processed in a similar manner as described above in relation to FIGS. 3 and 4, with some differences as described below. Specifically, a first instruction bundle for thread T3 is to be fetched from a first bank 270a (Bank 0) of second memory 270, a second bundle is to be fetched from a second bank 270b (Bank 1) of second memory 270, and a third bundle is to be fetched from a third bank 270c (Bank 2) of second memory 270. For thread T4, a first instruction bundle is to be fetched from a second bank 270b (Bank 1) of second memory 270 and a second bundle is to be fetched from the third bank 270c (Bank 2) of second memory 270.

In the first processor cycle, it is predicted in the first pre-stage 300 that, in the third processor cycle, thread T3 will be selected in FT stage 110. Accordingly, in the first processor cycle, a fetch from second memory 270 is scheduled to be initiated in the second pre-stage 310 (at N2), prior to the thread T3 being selected in the third processor cycle. The fetch is initiated (see N2 in Table 5) in the second processor cycle where the first of the four fetch cycles FC1a is performed.

The first instruction bundle associated with thread T3 is determined to be fetched from Bank 0 (270a) of the second memory 270. Consequently, the first pre-stage module 300 schedules a fetch from the first bank (Bank 0 270a) of second memory 270. At the second processor cycle, the first fetch cycle (FC1a) for thread T3 is performed from Bank 0 (270a). Similarly, at the third processor cycle, the second fetch cycle (FC2a) for thread T3 is performed from Bank 0 (270a). At the fourth processor cycle, the third fetch cycle (FC3a) is performed from Bank 0 (270a). Finally, in the fifth processor cycle, the fourth fetch cycle (FC4a) is performed for thread T3 from Bank 0 (270a) of the second memory 270, in order to complete the fetch of the first instruction bundle for thread T3 from Bank 0.

The first instruction bundle fetched for thread T3 is then passed to the FS stage 140 to be processed ahead of being passed to buffer 150 for execution. During the same cycle, i.e. the fifth processor cycle, in the first pre-stage 300 it is also predicted which thread is to be processed in a future cycle (the seventh processor cycle in this example). In the fifth processor cycle, in the first pre-stage 300 it is predicted that, at the seventh processor cycle, thread T3 will be selected again for processing and thus another fetch from second memory 270 is scheduled for the second instruction bundle associated with thread T3.

Specifically, the first pre-stage module 300 identifies that the second instruction bundle associated with thread T3 is to be fetched from the second bank, Bank 1 (270b) of second memory 270, which is currently being accessed by thread T4, but will become free in cycle 6. As such, the first pre-stage module 300 is configured to schedule the initiation of a fetch from the Bank 1 (270b) of second memory 270. In the sixth to ninth processor cycles, the four fetch cycles FC1b to FC4b are performed in order to fetch, from Bank 1 (270b) of the second memory 270, the second instruction bundle for thread T3.

As also illustrated in Table 5, there is also a third instruction bundle to be fetched from the second memory 270 which is to be fetched from Bank 2 (270c) of second memory 270. As above, at the ninth processor cycle it is predicted by first pre-stage module 300 that the thread to be selected for processing in the eleventh processor cycle is thread T3 and that the bundle to be fetched is located in Bank 2 (270c) of second memory 270. The third bundle for thread T3 is subsequently fetched from Bank 2 of second memory 270 from the tenth processor cycle to the thirteenth processor cycle (not shown in Table 5).

Similarly, there are two instruction bundles to be fetched for thread T4 within the time range shown in Table 5, namely a bundle from Bank 1 (270b) of second memory 270 and, subsequently, a bundle from Bank 2 (270c) of second memory 270. In the second processor cycle, it is predicted in the first pre-stage stage 300 that, in a future processor cycle, thread T4 will be selected in the FT stage 110 for processing. Specifically, in the first pre-stage stage 300 it is identified that thread T4 will be selected in the fourth processor cycle for processing. Thus, it schedules, prior to the thread being selected in the FT stage 210, a fetch procedure to fetch the instruction bundle for thread T4 from the second memory 270.

Since the first instruction bundle to be fetched for thread T4 resides in Bank 1 (270b) of the second memory 270, the first bundle for thread T4 can be fetched during the same processor cycles as the first bundle for thread T3. This is because thread T3 is seeking to fetch a bundle from a different bank of second memory 270 to Thread T4 and the banks are independently accessible.

For example, in the example of Table 5, thread T3 is accessing Bank 0 of the second memory 270 during the same processor cycles that thread T4 is accessing Bank 1 of the second memory (see the third to the fifth processor cycles). The approach laid out in FIGS. 5 and 6 is advantageous since it is possible for threads T3 and T4 to simultaneously fetch instruction bundles from second memory 270.

In other arrangements, it is only possible to have a single access to the second is memory 270 at a given instance in time. As such, thread T4 would have to wait for the second memory 270 to become available following completion of the fetch of the first instruction bundle for thread T3 before beginning the fetch of the first instruction bundle for thread T4 which would add latency to the processing of thread T4. Accordingly, the risk that a thread has to wait for access to second memory to become available is reduced by providing banks of memory that are individually accessible.

At the fifth processor cycle, fetch of the second instruction bundle of thread T3 is scheduled by the first pre-stage 300. The fetch is scheduled based upon a prediction that thread T3 (in ISP Mode) is to be selected for processing in FT stage 110 in the seventh processor cycle. Similarly, at the sixth processor cycle, fetch of the second instruction bundle of thread T4 is scheduled by the first pre-stage 300. As illustrated in Table 5, the second instruction bundle to be fetched for thread T3 is to be fetched from Bank 1 (270b) of the second memory 270 whereas the second instruction bundle to be fetched for thread T4 is to be fetched from the third bank, Bank 2 (270c). As such, both threads can access the second memory simultaneously during cycles 7 to 9.

Notably, at the sixth processor cycle, T3 is performing the first cycle of an access to Bank 1 (271b). In this same cycle, T4 is performing the fourth cycle of an access to the same bank (Bank 1 274b). These two simultaneous accesses are compatible taking into account the previous assumption that the 4 cycles for accessing a bank are distributed as: (1) three cycles to fetch an instruction bundle from the bank; and (2) a fourth cycle to select the bank and to perform additional processing (FIG. 6). That assumption translates into Bank 1 being busy with an access from T4 only during cycles 3 to 5 and Bank 1 being busy with an access from T3 only during cycles 6 to 8. An analogous scenario is found in cycle 10 for Bank 2.

A bank conflict can arise where more than one thread requests instructions from the same bank of second memory 270. To handle bank conflicts, the processing of a conflicting thread can be delayed until the next instance that the thread is predicted to be selected in the FT stage 110 two cycles later as part of the round-robin procedure. For example, in Table 5, if the first bundle for T4 was to be fetched from the first bank 270-a (Bank 0) of second memory 270 (instead of being fetched from the second bank 270-b, Bank 1, of second memory 270), a conflict would arise with thread T3. In this case, at cycle 2, in the N1 stage 300 and according to step 420-b, bank 270-a of the second memory would be detected to be busy and early fetch for thread T4 would have to be skipped. As such, two cycles later (i.e. in cycle 4), in the FT stage 110, thread T4 would be flagged as not ready to be selected by the round-robin scheme, and instead thread T1 would be selected in the FT stage 110. One cycle later (cycle 5), according to FIG. 4(b), an early access to the second memory could be initiated for thread T4 in the N1 stage 300, as in that cycle there would not exist a bank conflict with thread T3 any more (thread T3 released the first bank 270-a at cycle 4). Then, at cycle 7, thread T4 would be selected by the FT stage 110.

As illustrated in FIG. 5, an IFU 200 comprises an enhanced control module 230-2 which is configured to implement the methods described herein. Specifically, the enhanced control module 230-2 is configured to handle the management of the second memory 270 and the new stages (N1 300 and N2 310), to track and manage the mode state for each thread, to perform the prediction method as described with reference to FIG. 4(b) and the examples set out above and to perform the flushing and halting of threads when necessary.

The enhanced control module 230-2 is configured to manage each of the six stages illustrated in FIG. 3, namely the first pre-stage 300, the second pre-stage 310, FT stage

110, FA stage 120, FC stage 130, and FS stage 140. Specifically, the enhanced control module 230-2 may be configured to track the status of each stage, including which thread is being processed in each stage. The enhanced control module 230-2 manages flow of data between the various stages and the performance of tasks at each stage so as to ensure that the fetched instruction is passed to the buffer at the end of the FS stage 140.

In an example, the enhanced control module 230-2 is configured to perform, in the first pre-stage 300, the prediction of which thread is to be selected in the future processing cycle in accordance with step 410 of FIG. 4(*b*). As such, the enhanced control module 230-2 manages the scheduling scheme and, based on the scheme, makes a determination as to which thread will be selected.

The example enhanced control module 230-2 is configured to track and manage the mode of each thread and to manage a change of mode. As such, the enhanced control module 230-2 may be configured to store both the mode of each thread and the address range mapped to the second memory, to communicate with each of the six stages of the pipeline, receiving (among other things) the physical address after the virtual to physical address translation performed at the FC stage, to compare the physical address with the address range mapped to the second memory, and to decide if a thread should change its mode, triggering all the corresponding actions associated with it, such as conservatively killing all stages where the thread is being processed.

The example enhanced control module 230-2 may also be configured to monitor the availability of the second memory (e.g. the availability of each bank of the second memory) and to skip threads in the scheduling scheme that require a fetch from memory that is currently unavailable (430-*c*).

The example enhanced control module 230-2 is configured to manage addresses for accessing memories. For example, program counters for each of the threads that are being processed in the IFU should be managed and the address of the next instruction to be fetched for each thread generated by the enhanced control module 230-2. The enhanced control module 230-2 is also configured to take into account for that address generation instructions that may already have started fetching and also consider details like delay slot handling.

The example enhanced control module 230-2 may be configured to halt the processing of a particular thread under particular conditions. Advantageously, the second memory (or some banks of it if banking is implemented) may be freed sooner to allow other threads (or the same thread again) to access the memory under new conditions. This will be described in more detail below.

A fetch for a particular thread may be stopped as a result of a redirect. For example, where a thread is redirected from the execution unit due to a mispredicted branch, all pending fetches for that thread should be stopped. The second memory (or second memory banks) in use by that thread is freed for allocation by the scheduling scheme. Then, the halted thread will begin fetching through the redirected path.

A thread may be stopped as a result of a taken branch or a jump being found or predicted by the IFU. An example IFU resolves and predicts branches/jumps at the FS stage. All pending sequential fetches after the branch/jump for that thread are stopped and the banks of second memory used by that thread are immediately freed as described above for a redirect. The thread must restart fetching instructions through the taken path. Note that in the extreme case of only one fetchable thread which is operating in the second mode and is fetching back-to-back (as example in Table 6 will illustrate) there can be up to 4 pending sequential accesses to the second memory for the thread, at stages FC, FA, FT and N2, that need to be stopped.

A fetch for a thread may also be stopped as a result of an incorrect prediction performed in the first pre-stage 300. An example enhanced control module 230-2 is configured to perform an evaluation of such prediction, by comparing the predicted thread by the first pre-stage 300 and the selected thread by the FT stage 110. An incorrect prediction as to which thread will be selected for processing in a predetermined future processing cycle can show different combinations, each of which could be handled differently.

In one example, a first thread T1 (operating in the second mode, i.e. ISP mode) predicted for processing in a future processor cycle at the first pre-stage 300, may turn unfetchable before arriving at the FT stage 110 and thus not be selected by the schedule scheme at that stage. For example, a thread may turn unfetchable due to a TLB miss found for the thread in a previous instance of the same thread (i.e. which is more advanced in the pipeline). Access to the second memory by thread T1 would have to be stopped by the example enhanced control module 230-2, and the thread scheduler within the FT stage, could select for processing, instead T1, a different thread T2 (operating in the first mode), so as to prevent the processor cycle being wasted, e.g. to prevent a bubble appearing in the pipeline.

In another example, a first thread T1 (operating in the second mode, i.e. ISP mode) predicted for processing in a future processor cycle at the first pre-stage 300, may not be chosen at the predicted time at the FT stage by the schedule scheme (e.g. the round robin scheme) for other reasons, even being the thread still fetchable. For example, a second thread T2 operating in the first mode, which was not fetchable when the prediction was done, may become fetchable again in the later cycle. One approach is to override the typical scheduling scheme in this circumstance so as to allow the thread T1 to be selected by the scheduling scheme (delaying the selection of T2), so that the access to the second memory is not lost and so an effective misprediction does not occur.

In another example, a first thread T1 (operating in the first mode, i.e. I$ mode) predicted for processing in a future processor cycle at the first pre-stage, may become unfetchable before arriving at the FT stage 110 due to different reasons. When the predicted thread is in I$ mode no actions are taken at N1 nor at N2. As discussed previously, the enhanced control module 230-2 can simply select any other thread based on the scheduling scheme that accesses the first memory, avoiding the cycle to be lost.

In another example, a first thread T1 (operating in the first mode, i.e. I$ mode) predicted for processing in a future processor cycle at the first pre-stage, may not be selected at the predicted time by the round robin mechanism at the FT stage, which does not cause an issue and, instead, a different thread may be selected without conflict.

Although examples described in this document relate to a multithreaded arrangement, it will be appreciated that the teachings of this document apply equally to a single-threaded arrangement in which the instruction fetch unit is configured to fetch a plurality of program instructions relating to the execution of a program in a single thread. As such, it is not essential for the teachings of this document to be applied only to multithreaded arrangements.

TABLE 6

Processing of a single thread using the IFU of FIG. 3, where the thread requires back-to-back access to the second memory.

|  | C1 | C2 | C3 | C4 | C5 | C6 | C7 | C8 | C9 |
|---|---|---|---|---|---|---|---|---|---|
| T1 (ISP) Bundle 1 | N1 | N2 (FC1a) | FT (FC2a) | FA (FC3a) | FC (FC4a) | FS | | | |
| T1 (ISP) Bundle 2 | | N1 | N2 (FC1b) | FT (FC2b) | FA (FC3b) | FC (FC4b) | FS | | |
| T1 (ISP) Bundle 3 | | | N1 | N2 (FC1c) | FT (FC2c) | FA (FC3c) | FC (FC4c) | FS | |
| T1 (ISP) Bundle 4 | | | | N1 | N2 (FC1d) | FT (FC2d) | FA (FC3d) | FC (FC4d) | FS |
| T1 (ISP) Bundle 5 | | | | | N1 | N2 (FC1a) | FT (FC2a) | FA (FC3a) | FC (FC4a) |
| T1 (ISP) Bundle 6 | | | | | | N1 | N2 (FC1b) | FT (FC2b) | FA (FC3b) |
| T1 (ISP) Bundle 7 | | | | | | | N1 | N2 (FC1c) | FT (FC2c) |
| T1 (ISP) Bundle 8 | | | | | | | | N1 | N2 (FC1d) |

The example of Table 6 above illustrates a multithreaded arrangement in which four threads are present. Thread 1 (T1) is currently operating in the second ISP mode, while the remaining threads (T2, T3 and T4) are currently flagged as not fetchable and thus are skipped by the round robin scheduling scheme. This multithreaded scenario is analogous to a single-threaded arrangement.

Distribution of the instructions across the banks could be performed in a number of ways. For example, for handling efficiently the scenario described in the previous paragraph, a suitable organization would be to distribute the instruction bundles in a sequential fashion, i.e. the first bundle stored in the first bank, the second bundle stored in the second bank, and so on. This way, the single fetchable thread can be fetched back-to-back as long as the sequential fetch for the thread is not interrupted, for example, due to a taken branch.

In the example of Table 6, Thread 1 performs back-to-back fetching for several cycles. In the first to fourth processor cycles, all instruction bundles are fetched from different banks, so there are no collisions and the fetches can be performed concurrently. At the fourth processor cycle, the retrieval from the first bank for T1 is completed (i.e. FC3a for the first instruction bundle of T1) and the first bank becomes available from the fifth processor cycle on. Therefore, the fifth instruction bundle for the first thread T1, which must access the first bank again, could be scheduled to begin processing from the fifth processor cycle on, without introducing any bubble in the pipeline (note that it actually initiates access to that bank for fetching the fifth instruction bundle at cycle 6).

In this scenario, back-to-back fetching for thread T1 only needs to stall when the sequential fetch is interrupted, for example, due to a taken branch or jump, due to a misprediction, etc. In that case, as explained previously, all pending fetches for that thread would be stopped, introducing some bubbles in the instruction flow, and the halted thread would restart fetching through the correct path. As an example of this situation, suppose that in cycle 9 of Table 6, at FS, it was detected a branch predicted to be taken within bundle 4. In that scenario, fetch from all banks where the thread was present would be stopped (i.e. all four banks in this example), those banks would be released, and one cycle later (i.e. at cycle 10) an access using the branch target address would be scheduled in the second memory, which would reach the FS stage at cycle 15 (not shown in the Table 6), after 5 bubbles had been inserted in the instruction trace.

It will be appreciated that, in the multithreaded arrangement, each thread may be in either the first mode or the second mode in a given processor cycle, and also its state can be fetchable or unfetchable. As such, in any given processor cycle the threads may be in any combination of modes and fetchability states, depending upon several factors such as the pipeline state, the particular operation of the threads and the instructions that are to be processed, etc. The methods and apparatuses described herein provide a high throughput and a fair distribution of resources under any combination of modes and fetchability states for the threads conforming the multi-threaded workload.

Moreover, by implementing the methods and apparatuses described herein, it is possible to readily integrate additional functionality into an instruction fetch unit without the need for significant modification of other features of the IFU. In particular, the same pipeline stages and many of the structures in a prior IFU (including the TLB, Branch Predictor structures, etc.) are maintained, accessed and utilised as would be expected in the prior IFU. The additional features described herein can be integrated at the beginning of the fetch pipeline and prior fetch pipelines, for example for first memories, can operate as previously described with reference to FIG. 1 in parallel with the methods and apparatuses described herein.

A fetch procedure for fetching an instruction need not include all of the stages described in the examples. Moreover, a fetch procedure need not perform the described stages in the order that they are presented. Other fetch procedures may be envisaged in which additional stages may be added to the fetch procedure. Some stages of the fetch procedure may also be performed in parallel depending on the specific arrangement of the fetch procedure. It will be appreciated that the teachings can be applied to any fetch procedure.

For example, where the particular processor cycle in which a prediction takes place depends on fetch latency it may be possible to define the fetch latency between stages in the fetch procedure such that the instruction fetched from the second memory is retrieved in time for use without causing a collision. In some of the examples provided herein, two stages (first and second pre-stages) are provided to enable the initiation of a fetch to be scheduled in time. However, other is numbers of pre-stages are possible depending on the fetch procedure.

Figure 7:
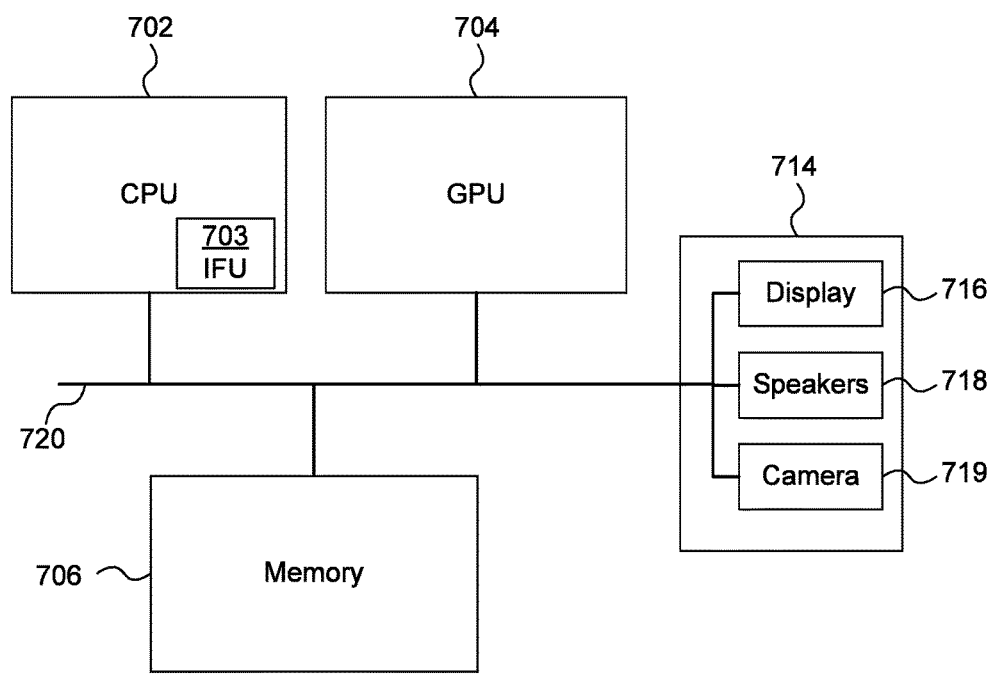
FIG. 7 shows an example computer system.

FIG. 7 shows a computer system in which a central processing unit (CPU) comprising an instruction fetch unit (IFU) as described herein may be implemented. The computer system comprises a CPU 702 that comprises an IFU 703, a GPU 704, a memory 706 and other devices 714, such as a display 716, speakers 718 and a camera 719. The components of the computer system can communicate with each other via a communications bus 720.

The instruction fetch units and fetch procedures of FIGS. 1 to 6 are shown as comprising a number of functional blocks. This is schematic only and is not intended to define a strict division between different logic elements of such entities. Each functional block may be provided in any suitable manner. It is to be understood that intermediate values described herein as being formed by an instruction fetch unit need not be physically generated by the instruction fetch unit at any point and may merely represent logical values which conveniently describe the processing performed by the instruction fetch unit between its input and output.

The instruction fetch units described herein may be embodied in hardware on an integrated circuit. The instruction fetch units described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor.

The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture an instruction fetch unit configured to perform any of the methods described herein, or to manufacture an instruction fetch unit comprising is any apparatus described herein. An integrated circuit definition dataset may be, for example, an integrated circuit description.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture an instruction fetch unit will now be described with respect to FIG. 8.

Figure 8:
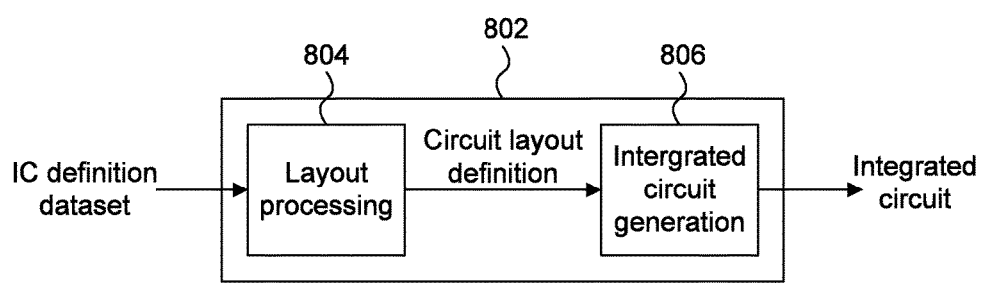
FIG. 8 shows an integrated circuit manufacturing system for generating an integrated circuit embodying an instruction fetch unit.

FIG. 8 shows an example of an integrated circuit (IC) manufacturing system 802 which comprises a layout processing system 804 and an integrated circuit generation system 806. The IC manufacturing system 802 is configured to receive an IC definition dataset (e.g. defining an instruction fetch unit as described in any of the examples herein), process the IC definition dataset, and generate an IC according to the IC definition dataset (e.g. which embodies an instruction fetch unit as described in any of the examples herein). The processing of the IC definition dataset configures the IC manufacturing system 802 to manufacture an integrated circuit embodying an instruction fetch unit as described in any of the examples herein.

The layout processing system 804 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 804 has determined the circuit layout it may output a circuit layout definition to the IC generation system 806. A circuit layout definition may be, for example, a circuit layout description.

The IC generation system 806 generates an IC according to the circuit layout definition, as is known in the art. For example, the IC generation system 806 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 806 may be in the form of computer-readable code which the IC generation system 806 can use to form a suitable mask for use in generating an IC.

The different processes performed by the IC manufacturing system 802 may be implemented all in one location, e.g. by one party. Alternatively, the IC manufacturing system 802 may be a distributed system such that some of the processes may be performed at different locations, and may be performed by different parties. For example, some of the stages of: (i) synthesising RTL code representing the IC definition dataset to form a gate level representation of a is circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture an instruction fetch unit without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 8 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 8, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The applicant hereby discloses in isolation each individual feature described herein and any combination of two or more such features, to the extent that such is features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method in an instruction fetch unit configured to initiate a fetch of an instruction bundle from a first memory and to initiate a fetch of an instruction bundle from a second memory, wherein a fetch from the second memory takes a predetermined fixed plurality of processor cycles, the method comprising:
   identifying that an instruction bundle is to be selected for fetching from the second memory in a predetermined future processor cycle based on a prediction, wherein the prediction comprises:
      predicting a thread to be selected in a predetermined future processor cycle;
      determining a mode for the predicted thread; and
      selecting the next fetch address for the predicted thread;
   allocating a thread to a first mode if it is determined that an instruction bundle associated with that thread is to be fetched from the first memory or allocating the thread to a second mode if it is determined that the instruction bundle associated with that thread is to be fetched from the second memory; and
   initiating a fetch of the identified instruction bundle from the second memory a number of processor cycles prior to the predetermined future processor cycle based upon the predetermined fixed plurality of processor cycles taken to fetch from the second memory.

2. The method according to claim 1, further comprising performing the fetch of the identified instruction bundle from the second memory in parallel with another memory access.

3. The method according to claim 1, wherein identifying that an instruction bundle is to be fetched from a second memory comprises determining whether a memory address of the instruction bundle is within a range of memory addresses in the second memory.

4. The method according to claim 1, wherein a fetch from the first memory takes one processor cycle and wherein the time taken between selecting an instruction bundle for fetching from the first memory and issuing the fetched instruction bundle is the fetch latency, wherein initiating a fetch of the identified instruction bundle from the second memory prior to the predetermined future processor cycle is further based upon the duration of the fetch latency.

5. The method according to claim 1, further comprising, each processor cycle, selecting an instruction bundle to be fetched.

6. The method according to claim 5, wherein selecting an instruction bundle to be fetched each processor cycle is performed based upon a round-robin schedule.

7. The method according to claim 1, wherein instruction bundles to be fetched are each associated with one of a plurality of threads.

8. The method according to claim 1, wherein predicting which bundle is to be selected for fetching in a predetermined future processor cycle comprises predicting which thread of a plurality threads is to be selected for fetching.

9. The method according to claim 8, wherein predicting which instruction bundle is to be selected for fetching in a predetermined future processor cycle is based upon predicting which thread will be selected according to a round-robin schedule.

10. The method according to claim 8, further comprising:
associating a flag with each thread, the flag indicating that the thread is either fetchable or unfetchable; and
predicting a thread to be selected based upon threads that are flagged as fetchable.

11. The method according to claim 8, further comprising:
flagging a thread as unfetchable due to at least one of a cache miss, a Translation Lookaside Buffer (TLB) miss, a buffer for execution being full, or a busy second memory bank; or
flagging a thread as fetchable due to the buffer for execution no longer being full, a stabilized thread, a free second memory bank, a restart of a thread, or due to cache or TLB miss handling being finished.

12. The method according to claim 1, further comprising identifying, in a future processor cycle, that the predicted instruction bundle was not selected for fetching and (i) halting the fetch of the predicted instruction bundle from the second memory; or selecting the predicted instruction bundle for fetching in place of the instruction bundle actually selected at the future predetermined processor cycle.

13. The method according to claim 1, further comprising identifying that a thread in the first mode requires a fetch from the second memory and changing the mode of the thread from the first mode to the second mode.

14. The method according to claim 1, further comprising identifying that a thread in the second mode requires a fetch from the first memory and changing the mode of the thread from the second mode to the first mode.

15. The method according to claim 1, wherein the first memory is an instruction cache and wherein the second memory is an Instruction Scratchpad Random-Access-Memory (ISPRAM).

16. An instruction fetch unit configured to initiate a fetch of an instruction bundle from a first memory and to initiate a fetch of an instruction bundle from a second memory, and wherein a fetch from the second memory takes a predetermined fixed number of processor cycles, the instruction fetch unit comprising:
a control module configured to:
identify that an instruction bundle is to be selected for fetching from the second memory in a predetermined future processor cycle based on a prediction, wherein the prediction comprises:
predicting a thread to be selected in a predetermined future processor cycle;
determining a mode for the predicted thread; and
selecting the next fetch address for the predicted thread;
allocate a thread to a first mode if it is determined that an instruction bundle associated with that thread is to be fetched from the first memory or allocating the thread to a second mode if it is determined that the instruction bundle associated with that thread is to be fetched from the second memory; and
initiate a fetch of the identified instruction bundle from the second memory a number of processor cycles prior to the predetermined future processor cycle based upon the predetermined fixed plurality of processor cycles taken to fetch from the second memory.

17. A computer readable storage medium having stored thereon a computer readable description of an integrated circuit that, when processed in an integrated circuit manufacturing system, causes the integrated circuit manufacturing system to manufacture an instruction fetch unit configured to initiate a fetch of an instruction bundle from a first memory and to initiate a fetch of an instruction bundle from a second memory, and wherein a fetch from the second memory takes a predetermined fixed plurality of processor cycles, wherein the instruction fetch unit comprises a control module configured to:
identify that an instruction bundle is to be selected for fetching from the second memory in a predetermined future processor cycle based on a prediction, wherein the prediction comprises:
predicting a thread to be selected in a predetermined future processor cycle;
determining a mode for the predicted thread; and
selecting the next fetch address for the predicted thread;
allocate a thread to a first mode if it is determined that an instruction bundle associated with that thread is to be fetched from the first memory or allocating the thread to a second mode if it is determined that the instruction bundle associated with that thread is to be fetched from the second memory; and
initiate a fetch of the identified instruction bundle from the second memory a number of processor cycles prior to the predetermined future processor cycle based upon the predetermined fixed plurality of processor cycles taken to fetch from the second memory.

* * * * *